US012695235B2

(12) United States Patent
Ishimaru et al.

(10) Patent No.: US 12,695,235 B2
(45) Date of Patent: Jul. 28, 2026

(54) CONNECTOR AND ASSEMBLY METHOD

(71) Applicant: I-PEX Inc., Kyoto (JP)

(72) Inventors: Masao Ishimaru, Ogori-city (JP); Masashi Nakamura, Ogori-city (JP)

(*) Notice: Subject to any disclaimer, the term of this patent is extended or adjusted under 35 U.S.C. 154(b) by 224 days.

(21) Appl. No.: 18/495,779

(22) Filed: Oct. 27, 2023

(65) Prior Publication Data

US 2024/0055794 A1 Feb. 15, 2024

Related U.S. Application Data

(63) Continuation of application No. PCT/JP2022/015942, filed on Mar. 30, 2022.

(30) Foreign Application Priority Data

Apr. 30, 2021 (JP) ................................ 2021-077874

(51) Int. Cl.
*H01R 13/502* (2006.01)
*H01R 13/6581* (2011.01)

(52) U.S. Cl.
CPC ....... *H01R 13/502* (2013.01); *H01R 13/6581* (2013.01)

(58) Field of Classification Search
CPC .............. H01R 13/502; H01R 13/6581; H01R 13/6585; H01R 24/60
See application file for complete search history.

(56) References Cited

U.S. PATENT DOCUMENTS

| | | |
|---|---|---|
| 8,241,065 B2 | 8/2012 | Ikari et al. |
| 9,011,177 B2 | 4/2015 | Lloyd et al. |

(Continued)

FOREIGN PATENT DOCUMENTS

| | | |
|---|---|---|
| CN | 107039850 | 8/2017 |
| CN | 112086775 | 12/2020 |

(Continued)

OTHER PUBLICATIONS

SOEI Patent and Law Firm, Statement of Related Matters, dated Dec. 14, 2023.

(Continued)

*Primary Examiner* — Abdullah A Riyami
*Assistant Examiner* — Nader J Alhawamdeh
(74) *Attorney, Agent, or Firm* — SHIPWAY IP

(57) ABSTRACT

A connector connected to a first cable including a first signal conductor and a second cable including a second signal conductor, include: a connector base including a facing surface configured to face an outer periphery of the first cable and an outer periphery of the second cable; an insulating first housing and an insulating second housing held by the connector base to be aligned along an arrangement orientation substantially parallel to the facing surface, and protrude from the connector base toward protruding direction along a fitting orientation intersecting the arrangement orientation; a base unit including: a conductive first signal contact held by the first housing and configured to be electrically connected to the first signal conductor; a conductive second signal contact held by the second housing and configured to be electrically connected to the second signal conductor; a conductive first shell fixed to the connector base to surround the first housing about an axis along the fitting orientation; and a conductive second shell fixed to the connector base to surround the second housing about an axis along the fitting orientation.

20 Claims, 17 Drawing Sheets

(56) References Cited

U.S. PATENT DOCUMENTS

| | | | | |
|---|---|---|---|---|
| 9,859,659 | B2 | 1/2018 | Resendez et al. | |
| 10,177,483 | B1 | 1/2019 | Horning et al. | |
| 11,637,390 | B2 | 4/2023 | Zerebilov et al. | |
| 11,652,321 | B2 | 5/2023 | Laurx et al. | |
| 11,677,188 | B2 | 6/2023 | Diaz et al. | |
| 11,831,106 | B2 | 11/2023 | Girard, Jr. et al. | |
| 2007/0197095 | A1 | 8/2007 | Feldman et al. | |
| 2008/0227334 | A1 | 9/2008 | Yoshioka et al. | |
| 2009/0305533 | A1 | 12/2009 | Feldman et al. | |
| 2010/0216342 | A1 | 8/2010 | Lin | |
| 2011/0285415 | A1 | 11/2011 | Uesaka et al. | |
| 2012/0058679 | A1 | 3/2012 | Ikari et al. | |
| 2016/0172791 | A1 | 6/2016 | Fan et al. | |
| 2017/0085034 | A1 | 3/2017 | De Geest et al. | |
| 2018/0034218 | A1 | 2/2018 | Zhu et al. | |
| 2018/0366843 | A1 | 12/2018 | Maki | |
| 2020/0212633 | A1* | 7/2020 | Masunaga | H01R 12/79 |
| 2022/0037837 | A1 | 2/2022 | Kondo et al. | |
| 2024/0055787 | A1* | 2/2024 | Ishimaru | H01R 12/75 |
| 2024/0055794 | A1* | 2/2024 | Ishimaru | H01R 13/6581 |
| 2024/0379262 | A1* | 11/2024 | Nakamura | H01R 13/6592 |
| 2025/0253591 | A1* | 8/2025 | Nakamura | H01R 13/6581 |

FOREIGN PATENT DOCUMENTS

| | | | |
|---|---|---|---|
| EP | 1970997 A2 * | 9/2008 | H01R 12/598 |
| JP | 2000-030807 | 1/2000 | |
| JP | 2000-173718 | 6/2000 | |
| JP | 2004-014353 | 1/2004 | |
| JP | 2004-103527 | 4/2004 | |
| JP | 2004-119035 | 4/2004 | |
| JP | 2004-192939 | 7/2004 | |
| JP | 2008-226731 | 9/2008 | |
| JP | 2009-152212 | 7/2009 | |
| JP | 3153260 | 8/2009 | |
| JP | 2011-243414 | 12/2011 | |
| JP | 2015-219987 | 12/2015 | |
| JP | 2016-511528 | 4/2016 | |
| JP | 2016-525771 | 8/2016 | |
| JP | 2019-003783 | 1/2019 | |
| JP | 2019-003856 | 1/2019 | |
| JP | 2019-175566 | 10/2019 | |
| JP | 2020-166970 | 10/2020 | |
| TW | 461626 | 10/2001 | |
| TW | 201222996 | 6/2012 | |
| TW | 1607604 | 12/2017 | |
| WO | 2014/160073 | 10/2014 | |
| WO | 2015/006395 | 1/2015 | |
| WO | 2022/083683 | 4/2022 | |
| WO | 2022/084750 | 4/2022 | |

OTHER PUBLICATIONS

International Search Report dated Jun. 21, 2022 for PCT/JP2022/015942.

International Search Report dated Jun. 21, 2022 for PCT/JP2022/015977.

International Preliminary Report on Patentability with Written Opinion dated Nov. 9, 2023 for PCT/JP2022/015942.

IInternational Preliminary Report on Patentability with Written Opinion dated Nov. 9, 2023 for PCT/JP2022/015977.

* cited by examiner

CONNECTOR AND ASSEMBLY METHOD

CROSS-REFERENCE TO RELATED APPLICATIONS

This application is a continuation application of PCT Application No. PCT/JP2022/015942, filed on Mar. 30, 2022, which claims the benefit of priority from Japanese Patent Application No. 2021-077874, filed on Apr. 30, 2021. The entire contents of the above listed PCT and priority applications are incorporated herein by reference.

BACKGROUND

Field

The present disclosure relates to a connector and a connector system.

Description of the Related Art

Japanese Unexamined Patent Publication No. 2019-3783 discloses a plug connector configured to mate with a receptacle connector that is connected to a circuit board. The plug connector includes a ground bar and a ground shell. The ground bar is electrically connected to terminal portions of outer conductors of a plurality of coaxial cables arranged in a row. The ground shell houses the terminal portions of the plurality of coaxial cables and the ground bar, and is configured to be grounded to the circuit board when mated with the receptacle connector.

SUMMARY

Disclosed herein is a connector connected to a first cable including a first signal conductor and a second cable including a second signal conductor. The connector may include: a connector base including a facing surface configured to face an outer periphery of the first cable and an outer periphery of the second cable; an insulating first housing and an insulating second housing held by the connector base to be aligned along an arrangement orientation substantially parallel to the facing surface, and protrude from the connector base toward protruding direction along a fitting orientation intersecting the arrangement orientation; a base unit including: a conductive first signal contact held by the first housing and configured to be electrically connected to the first signal conductor; a conductive second signal contact held by the second housing and configured to be electrically connected to the second signal conductor; a conductive first shell fixed to the connector base to surround the first housing about an axis along the fitting orientation; and a conductive second shell fixed to the connector base to surround the second housing about an axis along the fitting orientation.

Additionally, an assembly method is disclosed herein. The assembly method may include: letting an outer periphery of a first cable face a facing surface of a base unit including: a connector base including the facing surface; an insulating first housing and an insulating second housing aligned along an arrangement orientation substantially parallel to the facing surface, each of the first housing and the second housing protruding from the connector base along a first direction intersecting the arrangement orientation and substantially parallel to the facing surface; a first signal contact held by the first housing; and a second signal contact held by the second housing; connecting a first signal conductor of the first cable to the first signal contact; letting an outer periphery of a second cable face the facing surface; connecting a second signal conductor of the second cable to the second signal contact; placing, in a state where the first signal conductor is connected to the first signal contact, a conductive first shell to surround the first housing about an axis substantially parallel to the facing surface and intersecting the arrangement orientation; fixing the first shell to the connector base; placing, in a state where the second signal conductor is connected to the second signal contact, a conductive second shell to surround the second housing about an axis substantially parallel to the facing surface and intersecting the arrangement orientation; and fixing the second shell to the connector base.

DETAILED DESCRIPTION

In the following description, with reference to the drawings, the same reference numbers are assigned to the same components or to similar components having the same function, and overlapping description is omitted.

Figure 1:
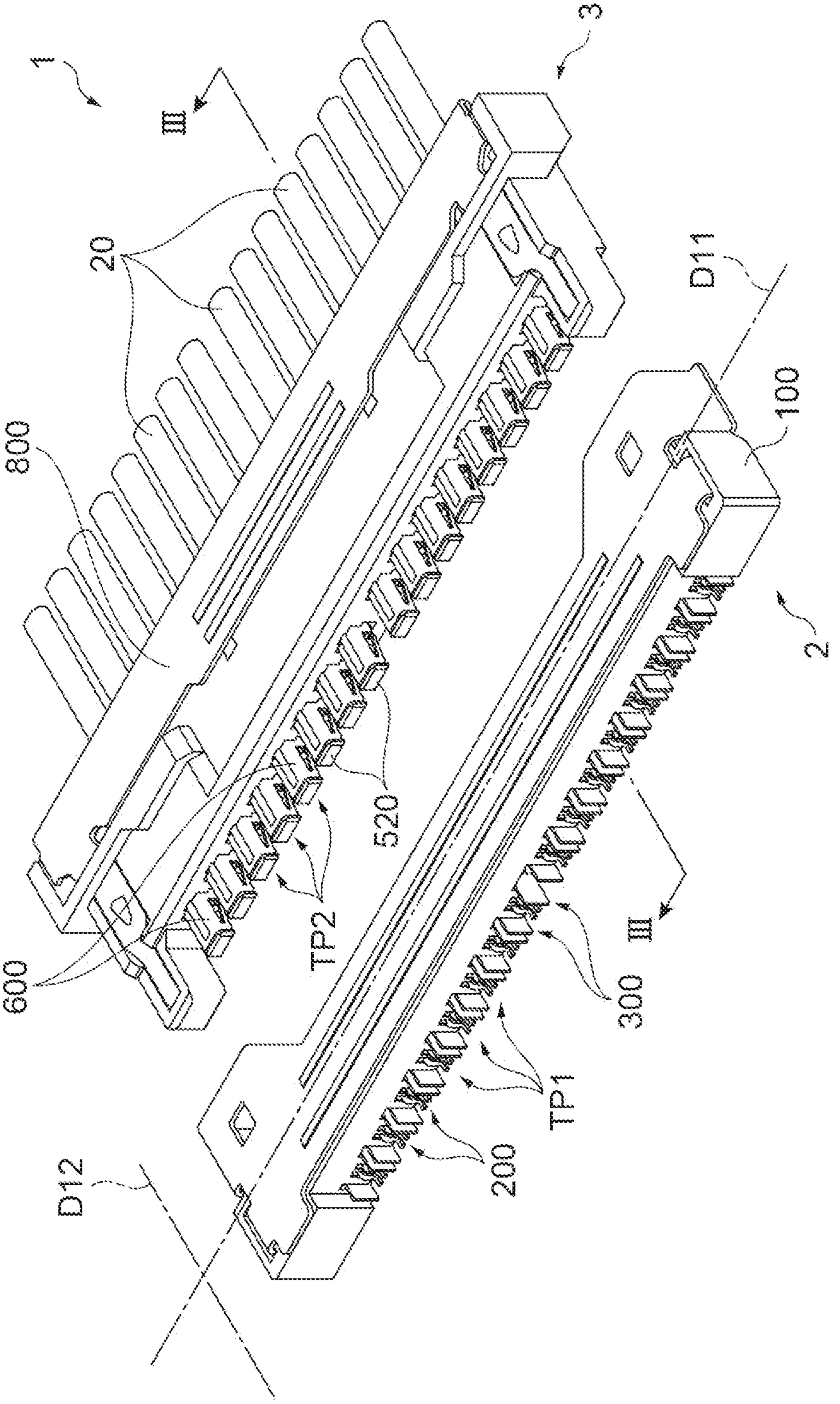
FIG. 1 is a perspective view illustrating an example connector system.
Figure 2:
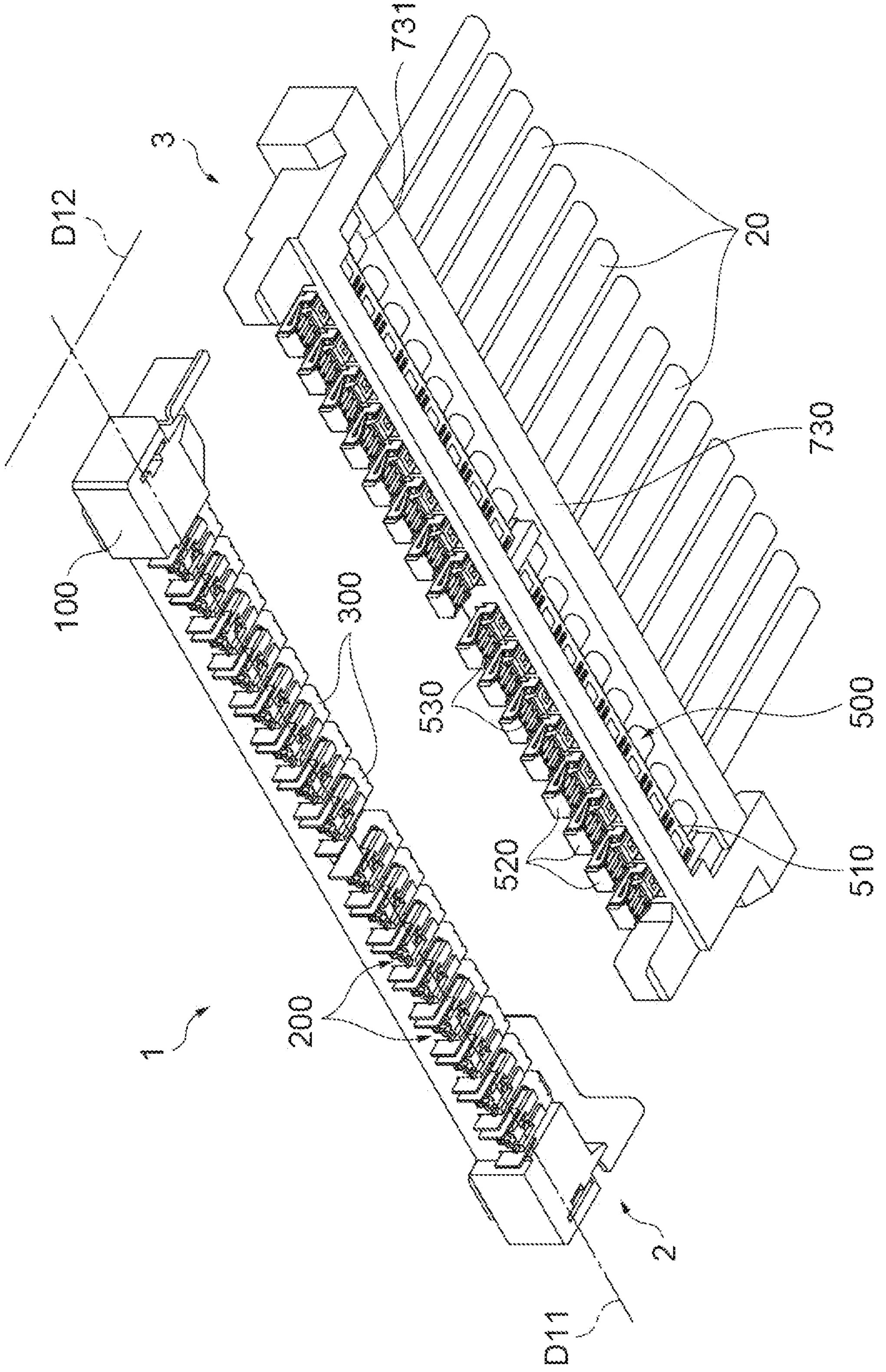
FIG. 2 is a perspective view of the connector system of FIG. 1 viewed from below.

Connector System A connector system 1 illustrated in FIGS. 1 and 2 is used for connecting a circuit board 10 (illustrated in FIG. 3) and a plurality of cables 20 in an application in which it is required to transmit a high-frequency signal with low degradation and to be low in height. One example of such an application is an information processing system that transmits signals on the circuit board 10 through the plurality of cables 20 instead of printed wiring on the circuit board 10. Signals can be transmitted with higher signal transmission characteristics by using a shielded cable or the like for each of the plurality of cables 20 than by using printed wiring. Signal transmission characteristics means how little the signal degradation in signal transmission is, and high signal transmission characteristics means that there is little signal degradation in signal transmission. Examples of the signal deterioration include mixing of noise due to crosstalk or the like and attenuation of a signal.

In order to further improve signal transmission characteristics of the plurality of cables 20, a connection point between the circuit board 10 and the plurality of cables 20 may be close to a circuit element (for example, a processor) on the circuit board 10. The connection point between the circuit board 10 and the plurality of cables 20 may be provided in the vicinity of the circuit element by avoiding interference with a heat sink or the like provided on the circuit element by reducing a height of the connector system 1.

The connector system 1 includes a first connector 2 and a second connector 3. The first connector 2 is, for example, a receptacle connector and is connected to the circuit board 10. The second connector 3 is, for example, a plug connector and is connected to the plurality of cables 20. The second connector 3 can be connected to the first connector 2. By connecting the second connector 3 to the first connector 2, the plurality of cables 20 are electrically connected to the circuit board 10. The first connector 2 and the second connector 3 fit together along a fitting orientation D12 substantially parallel to the circuit board 10.

The first connector 2 includes a plurality of signal contacts 200, a plurality of shells 300, and a housing 100. The plurality of signal contacts 200 are arranged along an arrangement orientation D11 substantially parallel to the circuit board 10 and intersecting (for example, substantially perpendicular to) the fitting orientation D12. Each of the plurality of signal contacts 200 is electrically connected to the circuit board 10 and contacts a signal contact of a mate connector (the second connector 3). Each of the plurality of shells 300 surrounds at least one signal contact 200 about an axis along the fitting orientation D12.

The plurality of signal contacts 200 transmit a plurality of types of signals. The plurality of shells 300 may be provided for each of the plurality of types of signals. In a region surrounded by each of the plurality of shells 300, one type of signal is transmitted and other signals are not transmitted. As an example, each of the plurality of signal contacts 200 may transmit one type of signal based on the ground potential. The plurality of shells 300 are respectively provided for the plurality of signal contacts 200. Each of the plurality of shells 300 surrounds one signal contact 200 and does not surround other signal contact 200. The plurality of signal contacts 200 may include a plurality of pairs of signal contacts 200 that respectively transmit a plurality of types of differential signals. The plurality of shells 300 are respectively provided for the plurality of pairs of the signal contact 200. Each of the plurality of shells 300 surrounds one pair of the signal contacts 200 and does not surround other signal contact 200.

The housing 100 integrally holds the plurality of signal contacts 200 and the plurality of shells 300.

Figure 10:
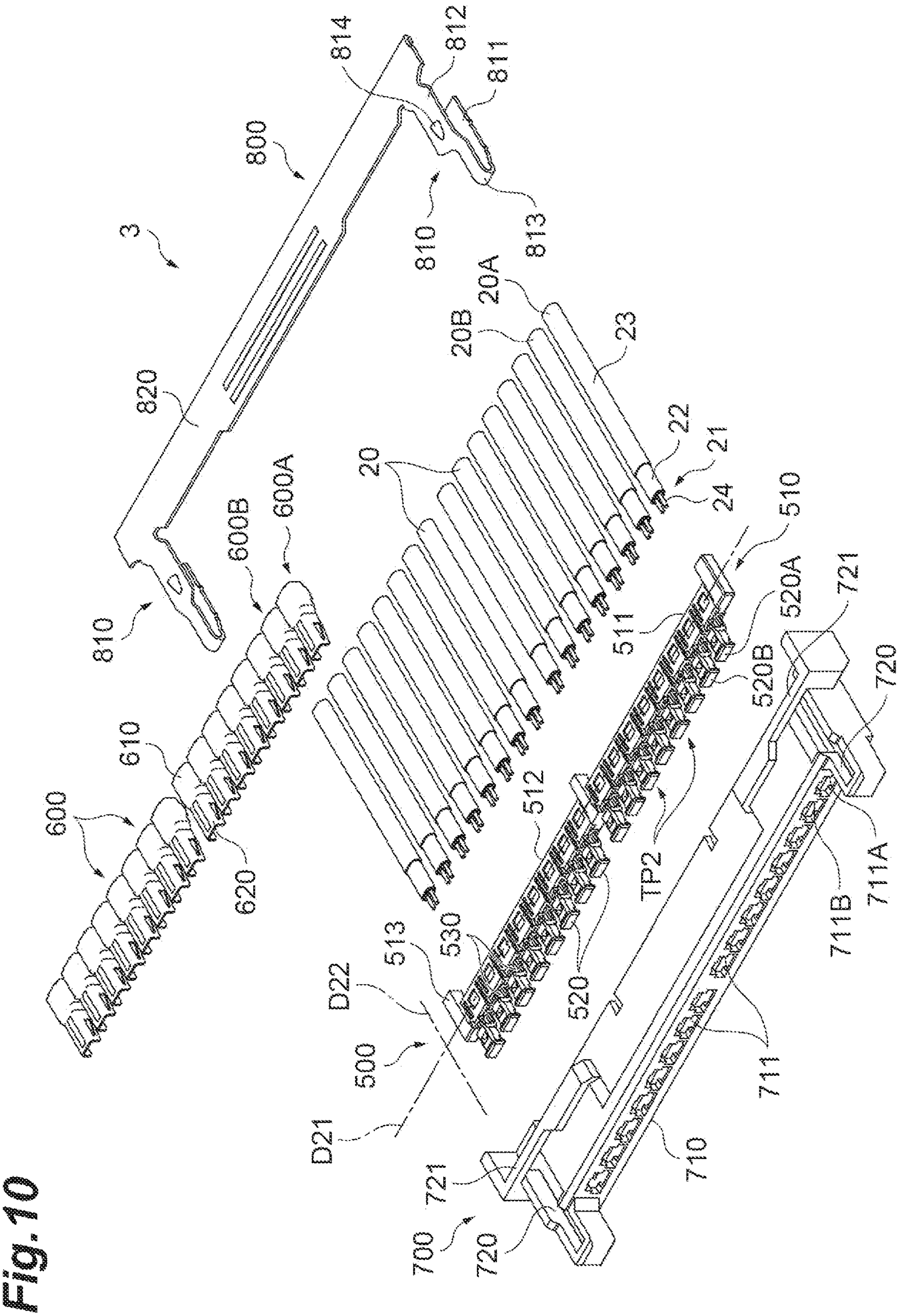
FIG. 10 is an exploded perspective view of the second connector in FIG. 1.

The second connector 3 includes a base unit 500 and a plurality of shells 600, as illustrated in FIGS. 1 and 10. The base unit 500 includes a connector base 510, a plurality of insulating housings 520, and a plurality of conductive signal contacts 530. The connector base 510 extends along the arrangement orientation D11 (D21). The plurality of the housing 520 are arranged along the arrangement orientation D11 and protrude from the connector base 510 in the same direction along the fitting orientation D12 (D22).

The plurality of signal contacts 530 are held by the plurality of housings 520 so as to be arranged along the arrangement orientation D11. Each of the plurality of signal contacts 530 is electrically connected to any of the plurality of cables 20 and contacts the signal contact 200 of the mate connector (the first connector 2). Each of the plurality of housings 520 holds at least one signal contact 530.

The plurality of signal contacts 530 may transmit the plurality of types of signals described above, and the plurality of housings 520 may be provided for each of the plurality of types of signals. In the plurality of housings 520, one type of signal is transmitted and other signals are not transmitted. As an example, each of the plurality of signal contacts 530 may transmit one type of signal based on the ground potential. In this case, the plurality of the housing 520 are provided for each of the plurality of signal contacts 530. Each of the plurality of housings 520 holds only one signal contact 530 and does not hold another signal contact 530. The plurality of signal contacts 530 may include a plurality of pairs of signal contacts 530 that respectively transmit a plurality of types of difference signals. In this case, the plurality of housings 520 are provided for each of the plurality of pairs of signal contacts 530. Each of the plurality of housings 520 holds only one pair of signal contacts 530 and does not hold another signal contact 530.

The plurality of shells 600 correspond to the plurality of housings 520, respectively. Each of the plurality of shells 600 encloses a corresponding housing 520 about an axis along the fitting orientation D12 (D22).

Figure 3:
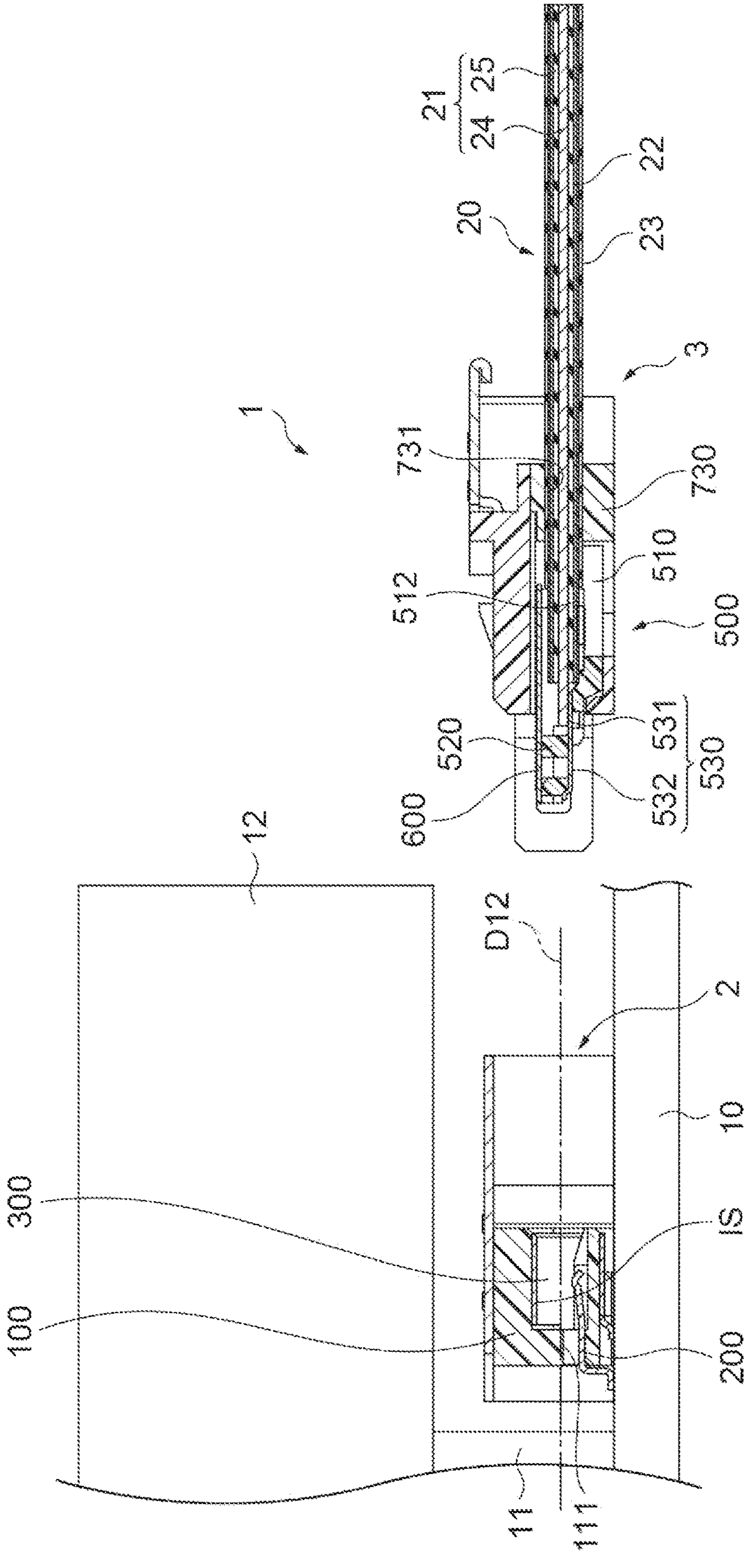
FIG. 3 is a cross-sectional view taken along line III-III in FIG. 1.
Figure 4:
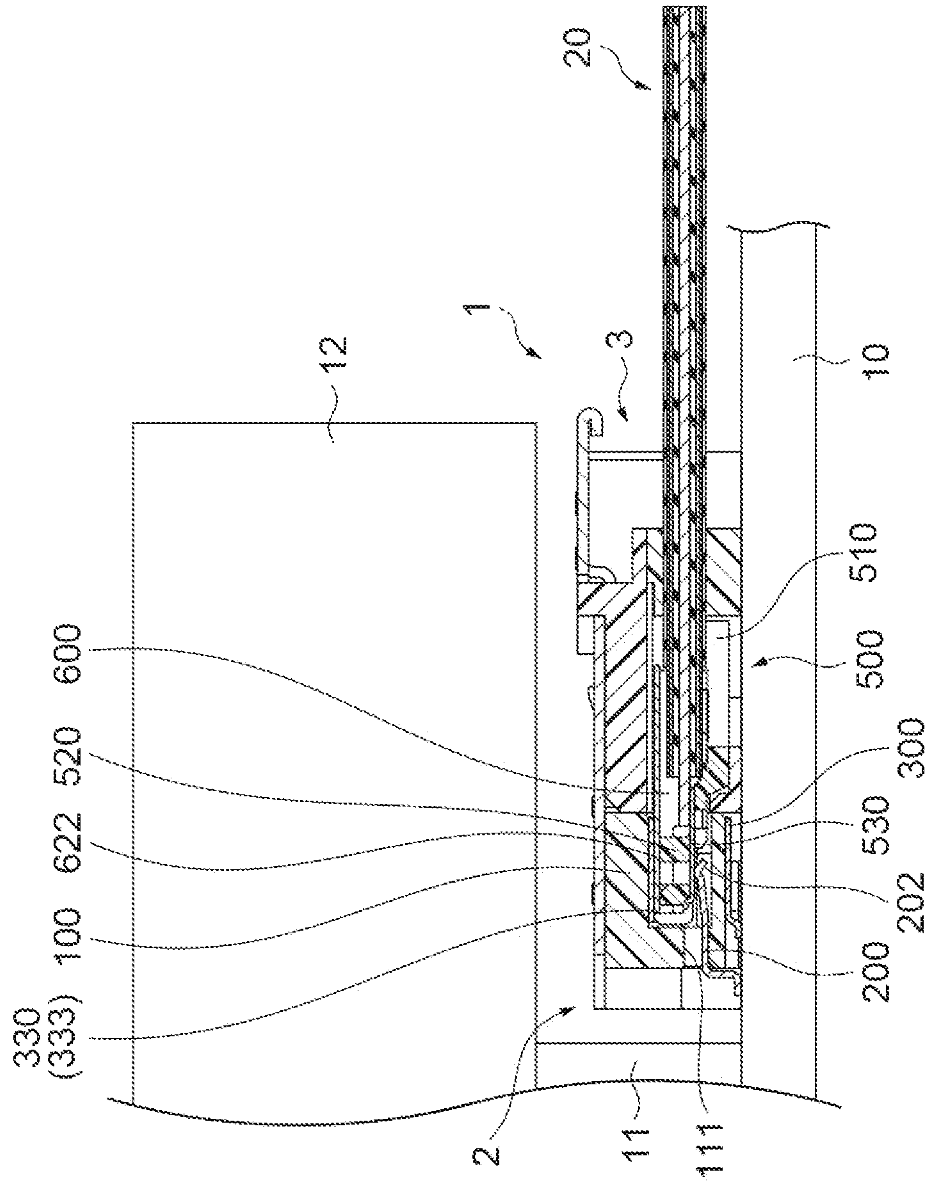
FIG. 4 is a cross-sectional view illustrating a state in which a second connector in FIG. 3 is fitted to a first connector.

The plurality of housings 520 correspond to the plurality of shells 300, respectively. As illustrated in FIGS. 3 and 4, each of the plurality of housings 520 is inserted into a corresponding shell 300 along the fitting orientation D12. Each of the plurality of shells 600 fits into a corresponding shell 300 along the fitting orientation D12. Each of the plurality of signal contacts 530 contacts a corresponding signal contact 200 in a corresponding shell 300. Thus, the plurality of cables 20 are electrically connected to the circuit board 10.

According to this the connector system 1, the relationship between the signal contact 200 and the shell 300 can be individually optimized by providing an individual shell 300 for each of the plurality of signal contacts 200. Further, the shell 300 surrounds the signal contact 200 about an axis along the fitting orientation D12 substantially parallel to the circuit board 10. As a result, the fitting orientation of the second connector 3 with respect to the first connector 2 is restricted to a direction substantially parallel to the circuit board 10. For this reason, the height of the connection portion constituted by the first connector 2 and the second connector 3 may be reduced (the height from the front face of the circuit board 10 may be reduced). Therefore, both improvement in signal transmission characteristics and reduction in height may be achieved.

By reducing the height, for example, as illustrated in FIGS. 3 and 4, interference with the heat sink 12 or the like may be reduced and the first connector 2 may be disposed in the vicinity of a circuit element 11, and thus signal transmission characteristics may further be improved.

Each of the plurality of shells 300 may complement an enclosure of the housing 520 by a corresponding shell 600. For example, the shell 300 may surround a portion of the perimeter of the housing 520 that is not surrounded by the shell 600. As a result, the height can be further reduced by reducing the overlap between the shell 600 and the shell 300.

Hereinafter, example configurations of the first connector 2 and the second connector 3 will be described in more detail.

First Connector

Figure 5:
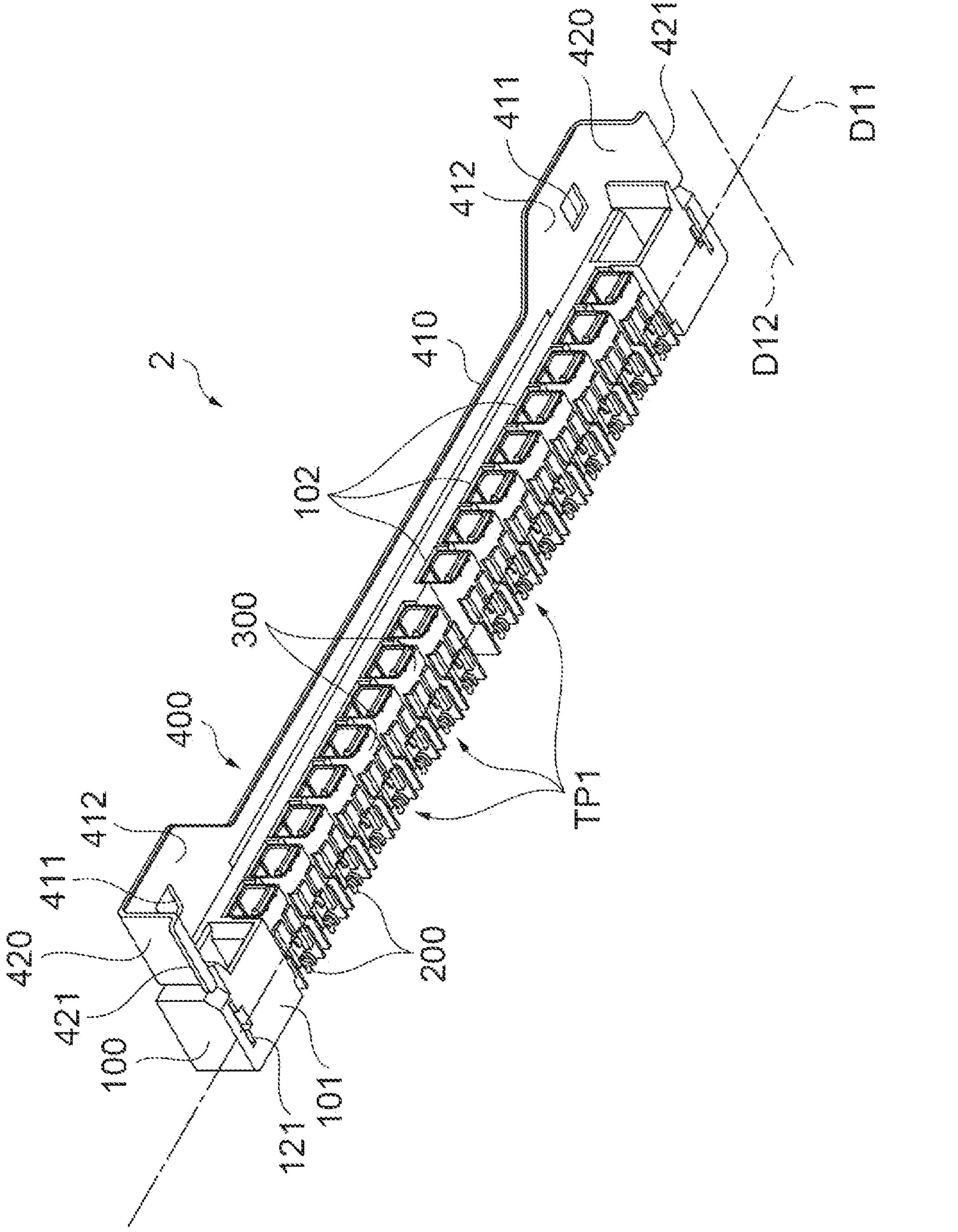
FIG. 5 is a perspective view of the first connector in FIG. 1 viewed from below.
Figure 6:
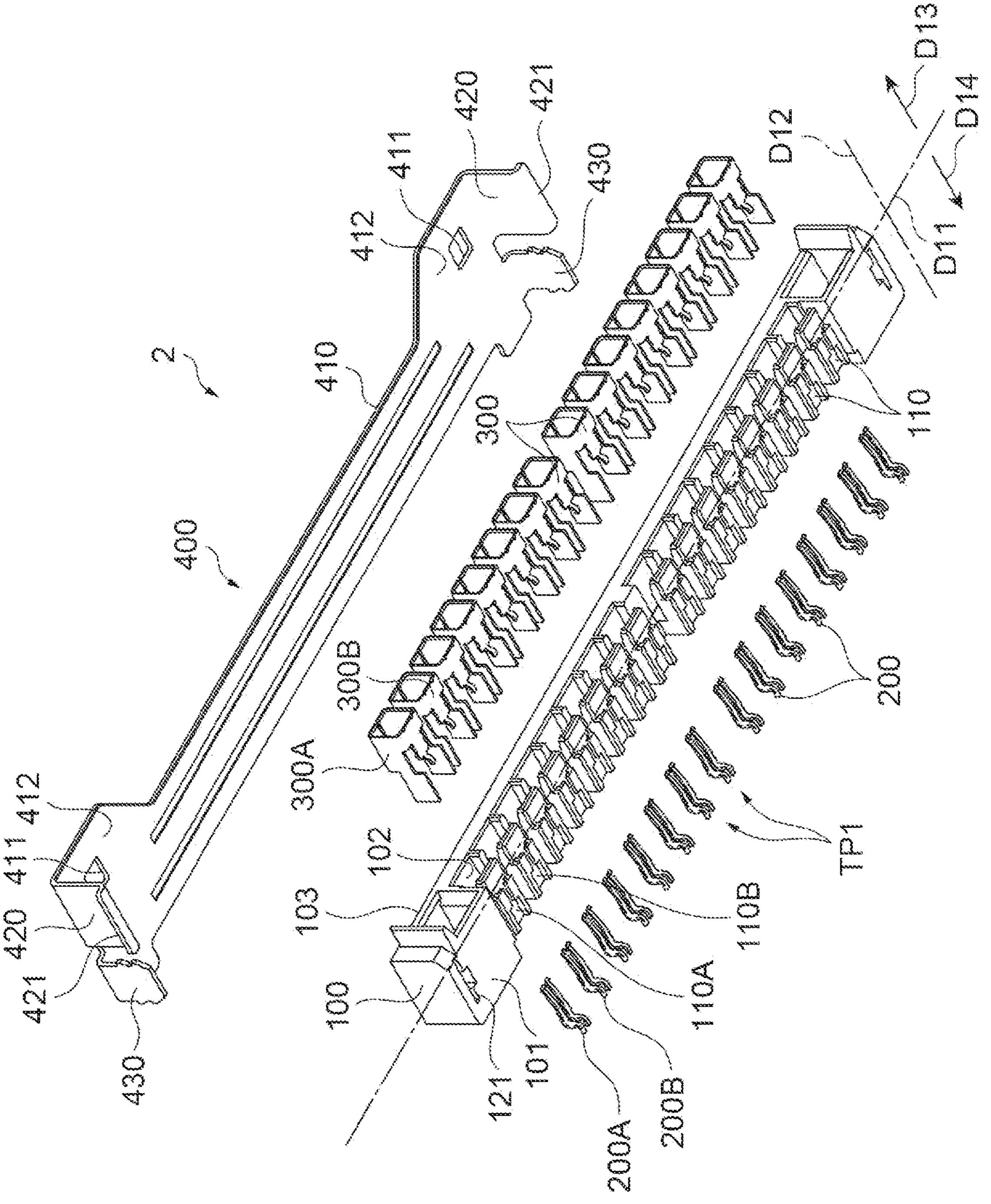
FIG. 6 is an exploded perspective view of the first connector in FIG. 5.

In the description of the first connector 2, for the sake of convenience, a direction toward the surfaces of the circuit boards is referred to as "below", and a direction away from the surfaces of the circuit boards is referred to as "above". FIG. 5 is a perspective view of the first connector 2 as viewed from below, and FIG. 6 is an exploded perspective view of the first connector 2 in FIG. 5. As illustrated in FIG. 5, the first connector 2 includes an insulating the housing 100, the plurality of conductive signal contacts 200, and the plurality of conductive shells 300.

Figure 7:
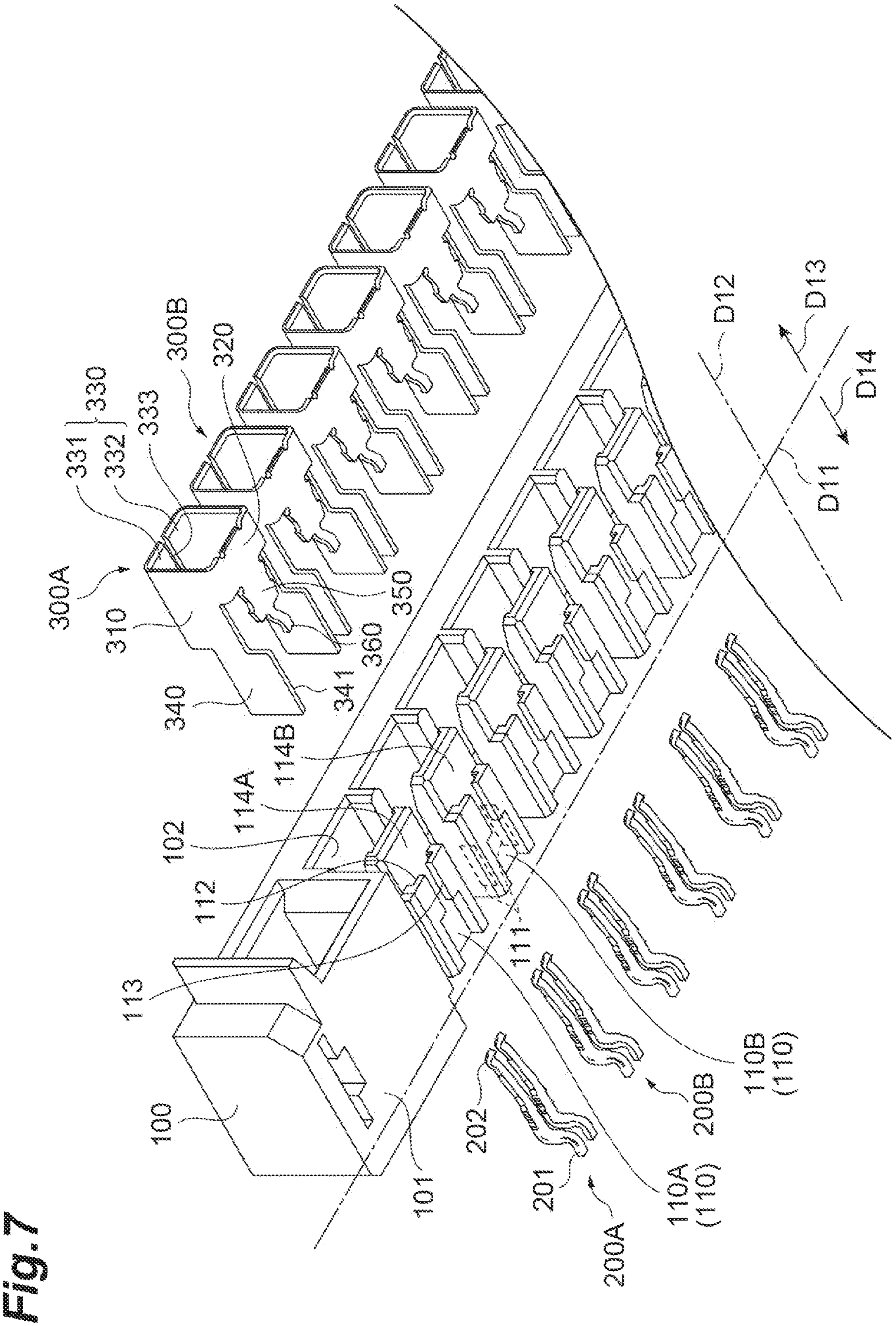
FIG. 7 is a partial enlarged view of FIG. 6.

As illustrated in FIGS. 6 and 7, the housing 100 has a facing surface 101, a receding surface 102, and a plurality of protrusions 110. The facing surface 101 faces the circuit board 10. The receding surface 102 faces the circuit board 10 at a location away from the circuit board 10 in a state where the facing surface 101 faces the circuit board 10. The plurality of protrusions 110 are aligned along the arrangement orientation D11 substantially parallel to the facing surface 101 and each protrude from the receding surface 102.

The plurality of protrusions 110 correspond to the plurality of shells 300, respectively. Each of the plurality of shells 300 is held in a corresponding protrusion 110. At least one signal contact 200 surrounded by each of the plurality of shells 300 is also held by the protrusion 110. For example, a pair of the signal contacts 200 surrounding each of a plurality of the shell 300 is held by the protrusion 110 so as to line up along the arrangement orientation D11. The housing 100 is formed by molding or the like of a resinous material.

One protrusion 110, its corresponding shell 300, and a pair of the signal contacts 200 constitute one set of a signal transmission portion TP1. The first connector 2 includes a plurality of sets of signal transmission portions TP1 each corresponding to the plurality of protrusions 110. The plurality of sets of signal transmission portions TP1 are arranged along the arrangement orientation D11 and transmit the plurality of types of signals described above, respectively. Hereinafter, as a representative of the plurality of sets of the signal transmission portions TP1, example configurations of two sets of the signal transmission portions TP1 which are the first and second from the left side in the drawing will be described in more detail.

Although the plurality of sets of the signal transmission portions TP1 have a common configuration, for convenience of description, the protrusion 110, the signal contacts 200, and the shell 300 belonging to the first the signal transmission portion TP1 from the left side of the drawing are defined as a first protrusion 110A, first signal contacts 200A, and a first shell 300A, and the protrusion 110, the signal contacts 200, and the shell 300 belonging to the second the signal transmission portion TP1 from the left side of the drawing are defined as a second protrusion 110B, second signal contacts 200B, and a second shell 300B.

In particular, as illustrated in FIG. 7, the first signal contacts 200A and the second signal contacts 200B are held in the housing 100 so as to be aligned along the arrangement orientation D11. For example, a pair of the first signal contacts 200A is held by the first protrusion 110A so as to be aligned along the arrangement orientation D11, a pair of the second signal contacts 200B is held by the second protrusion 110B so as to be aligned along the arrangement orientation D11, and a pair of the first signal contacts 200A and a pair of the second signal contacts 200B are aligned along the arrangement orientation D11 corresponding to the arrangement of the first protrusion 110A and the second protrusion 110B.

The pair of the first signal contacts 200A transmit a first differential signal. The pair of the second signal contacts 200B transmit a second differential signal that is different from the first differential signal.

Each of the pair of the first signal contacts 200A include a connection portion 201 (first connection portion) and a contact portion 202 (first contact portion). The connection portion 201 is electrically connected to the circuit board 10. For example, the connection portion 201 is connected to a conductive signal terminal formed on the circuit board 10 by soldering or the like. The contact portion 202 protrudes from the connection portion 201 along the fitting orientation D12 substantially parallel to the facing surface 101 and intersecting (for example, substantially perpendicular to) the arrangement orientation D11. Hereinafter, for convenience of description, a protruding direction of the contact portion 202 with respect to the connection portion 201 is referred to as "front", and an opposite direction thereof is referred to as "rear". The first signal contact 200A is bent in a crank shape between the connection portion 201 and the contact portion 202 so that the contact portion 202 is located away from the circuit board 10. The first signal contact 200A is formed by, for example, punching and bending a metallic thin plate material.

Each of the pair of the second signal contacts 200B is configured similar to the first signal contacts 200A and includes a connection portion 201 (second connection portion) and a contact portion 202 (second contact portion). The connection portion 201 of the second signal contact 200B is connected by soldering or the like to a conductive signal terminal formed on the circuit board 10 separately from the signal terminal to which the connection portion 201 of the first signal contact 200A is connected.

The first shell 300A is held in the housing 100 to surround a pair of the first signal contacts 200A about an axis along the fitting orientation D12 and is electrically connected to the circuit board 10 in a state where the facing surface 101 faces the circuit board 10. The surrounding may not be limited to surrounding the entire circumference of the target object, and may include partially surrounding the target object. For example, if the target object is facing a half or more of the entire circumference of the target object, it can be included in "surrounding". The same applies to the following description.

In the fitting orientation D12, the first shell 300A may partially surround the pair of first signal contacts 200A. For example, the first shell 300A surrounds at least one pair of the contact portions 202 of the first signal contacts 200A.

In the first shell 300A, signals other than one type of signal transmitted by at least one first signal contact 200A are not transmitted. The one type of signal is the only signal transmitted within the first shell 300A. For example, in the first shell 300A, only the first differential signal is transmitted, and other signals are not transmitted. The first shell 300A surrounds only one pair of the first signal contact 200A and does not surround another signal contact 200.

The shape surrounding the pair of first signal contacts 200A is not particularly limited. The first shell 300A may surround the pair of first signal contacts 200A in a circular shape or surround the pair of first signal contacts 200A in a polygonal shape. As an example, the first shell 300A may surround the first signal contact 200A in a rectangular shape.

For example, the first shell 300A may include a pair of side walls 310 (first side wall) and a coupling wall 320 (first coupling wall).

The pair of side walls 310 face each other along the arrangement orientation D11. The contact portions 202 of the pair of first signal contact 200A are located between the pair of side walls 310. The coupling wall 320 extends substantially parallel to the facing surface 101 and connects the pair of side walls 310. In a state where the facing surface 101 faces the circuit board 10, the coupling wall 320 may be located between the contact portion 202 and the circuit board 10.

The first shell 300A may further include a facing wall 330 (first facing wall). The facing wall 330 faces the coupling wall 320 along a direction intersecting (for example, substantially perpendicular to) the facing surface 101. The contact portions 202 of the pair of first signal contacts 200A is located between the coupling wall 320 and the facing wall 330. As described above, if the coupling wall 320 is located between the contact portion 202 and the circuit board 10, the facing wall 330 is located between the contact portion 202 and the receding surface 102.

Figure 8:
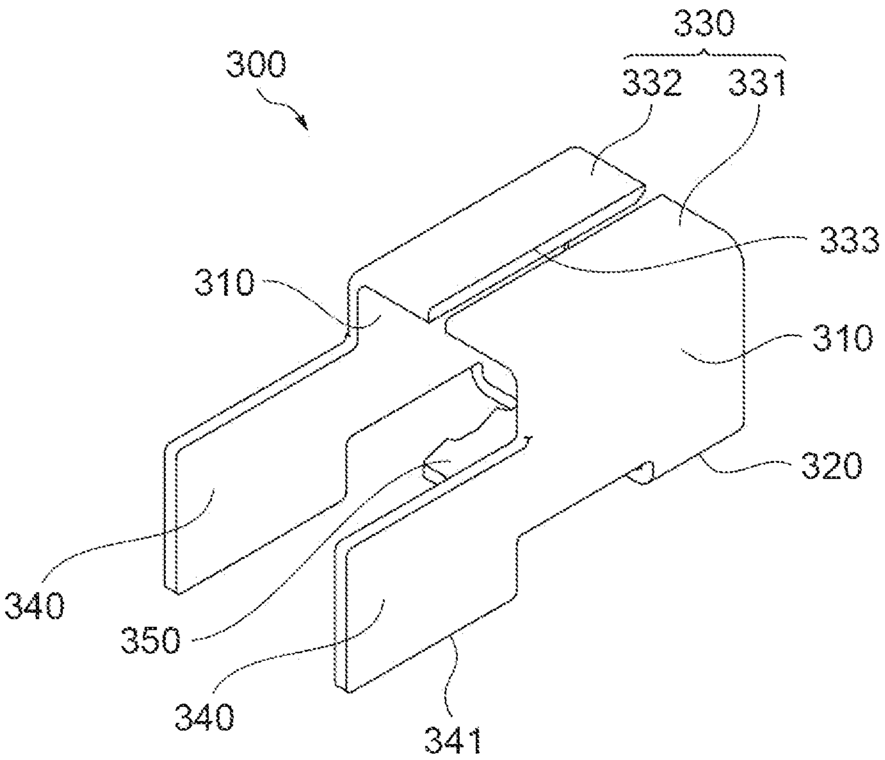
FIG. 8 is an enlarged view of a shell of the first connector viewed from above.

The first shell 300A may further include a shell slit 333 (first shell slit) that divides the facing wall 330 to correspond to the pair of side walls 310 (see FIG. 8). For example, the shell slit 333 is formed along the fitting orientation D12 over the entire length of the facing wall 330 and divides the facing wall 330 into a portion 331 corresponding to one side wall 310 and a portion 332 corresponding to the other side wall 310.

A receiving space IS (first receiving space IS) is formed between the contact portion 202 and the facing wall 330. A mate first housing (any one of the plurality of housings 520) of the mate connector (the second connector 3) is inserted into the receiving space IS along the fitting orientation D12, the shell 600 surrounding the mate first housing is fitted to the first shell 300A, and a mate signal contact (the signal contact 530) held by the mate first housing comes into contact with the contact portion 202 of the first signal contact 200A (see FIG. 4). For example, the pair of signal contacts 530 contact the contact portions 202 of the pair of the first signal contacts 200A, respectively.

The first shell 300A may further include a pair of projecting portions 340 (first projecting portion) projecting rearwardly from the pair of side walls 310, respectively. The connection portions 201 of the pair of first signal contact 200A is located between the pair of projecting portions 340.

The first shell 300A may further include a pair of shell connection portions 341 (first shell connection portion) respectively formed on the pair of projecting portions 340 to be electrically connected to the circuit board 10 in a state where the facing surface 101 faces the circuit board 10. For example, each of the pair of shell connection portions 341 is formed at the lower edge of the corresponding projecting portion 340 and is connected by soldering or the like to a conductive ground terminal formed on the circuit board 10 separately from the above-described signal terminal. In the circuit board 10, a ground potential is applied to the ground terminal. The same applies to a ground terminal to which another portion of the shell connection portion 341 is connected.

Figure 9:
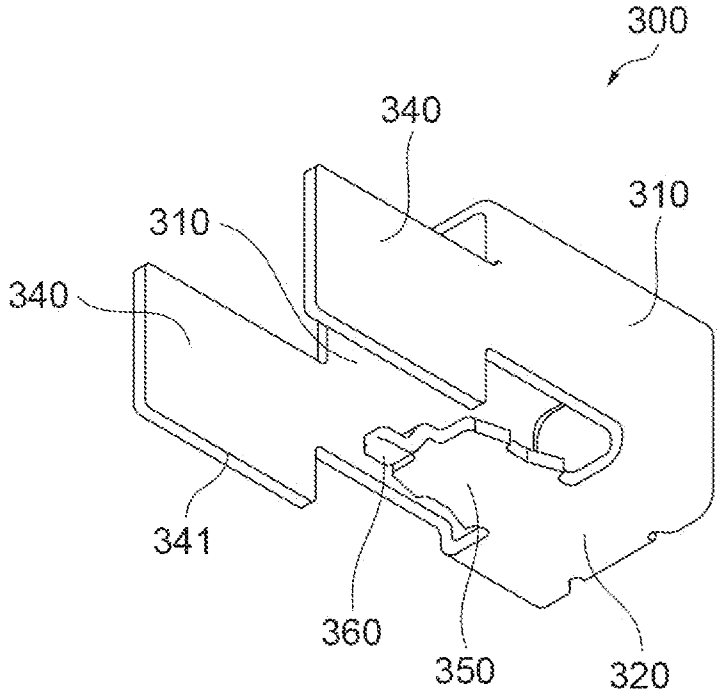
FIG. 9 is an enlarged view of the shell of the first connector viewed from below.

The first shell 300A may further include an anchor portion 350 (first anchor portion) and an intermediate connection portion 360 (first intermediate connection portion) (see FIG. 9). The anchor portion 350 projects rearward from the coupling wall 320 and is held by the first protrusion 110A. The intermediate connection portion 360 is formed at the coupling wall 320 to be electrically connected to the circuit board 10 in a state where the facing surface 101 faces the circuit board 10. For example, the intermediate connection portion 360 is formed in the rear end portion of the anchor portion 350 and protrudes from the rear end portion of the anchor portion 350 in a direction away from the receding surface 102. As an example, the intermediate connection portion 360 protrudes rearward and downward from a rear end portion of the anchor portion 350 and is connected to a ground terminal formed on the circuit board 10 by soldering or the like.

The first shell 300A is formed by, for example, punching and bending a metallic thin plate.

The second shell 300B is held in the housing 100 to surround the pair of second signal contacts 200B about an axis along the fitting orientation D12 and is electrically connected to the circuit board 10 in a state where the facing surface 101 faces the circuit board 10. For example, the second shell 300B surrounds at least the contact portions 202 of one pair of the second signal contacts 200B. In the second shell 300B, signals other than one type of signal transmitted by at least one second signal contact 200B are not transmitted. The one type of signal is the signal transmitted within the second shell 300B. For example, in the second shell 300B, the second differential signal is transmitted, and other signals are not transmitted. The second shell 300B surrounds one pair of the second signal contacts 200B and does not surround another signal contact 200.

The second shell 300B is configured similar to the first shell 300A and includes a pair of side walls 310 (second side wall) and a coupling wall 320 (second coupling wall). The contact portions 202 of the pair of second signal contacts 200B are positioned between the pair of side walls 310.

Similarly to the first shell 300A, the second shell 300B may also have the facing wall 330 (second facing wall) and the shell slit 333 (second shell slit). The contact portions 202 of the pair of second signal contacts 200B is located between the coupling wall 320 and the facing wall 330. If the coupling wall 320 is located between the contact portion 202 and the circuit board 10, the facing wall 330 is located between the contact portion 202 and the receding surface 102.

The receiving space IS (second receiving space) is formed between the contact portion 202 and the facing wall 330. A mate second housing (any one of the plurality of housings 520) of the mate connector (the second connector 3) is inserted into the receiving space IS along the fitting orientation D12, the shell 600 surrounding the mate second housing is fitted to the second shell 300B, and a mate signal contact (the signal contact 530) held by the mate second housing comes into contact with the contact portion 202 of the second signal contact 200B (see FIG. 4). For example, the pair of signal contacts 530 contact the contact portions 202 of the pair of second signal contacts 200B, respectively.

Similarly to the first shell 300A, the second shell 300B may further include a pair of projecting portions 340 (second projecting portion) and a pair of shell connection portions 341. The connection portions 201 of the pair of second signal contacts 200B is positioned between the pair of projecting portions 340. Similarly to the pair of shell connection portions 341 of the first shell 300A, the pair of shell connection portions 341 of the second shell 300B are connected to a ground terminal formed on the circuit board 10 by soldering or the like.

Similarly to the first shell 300A, the second shell 300B may also include the anchor portion 350 and the intermediate connection portion 360. The anchor portion 350 projects rearwardly from the coupling wall 320 and is held by the second protrusion 110B. The intermediate connection portion 360 is connected to a ground terminal formed on the circuit board 10 by soldering or the like.

As illustrated in FIG. 7, the first protrusion 110A protrudes from the receding surface 102 and is located between the pair of projecting portions 340 of the first shell 300A and holds the pair of first signal contacts 200A and the first shell 300A. For example, the first protrusion 110A includes a pair of contact holding holes 111 (located above the first protrusion 110A) and an anchor hole 112. The pair of contact holding holes 111 are arranged along the arrangement orientation D11 and each pass through the first protrusion 110A along the fitting orientation D12. The contact portions 202 of the pair of first signal contacts 200A are inserted into the pair of contact holding holes 111 from the rear. End portions of the contact portions 202 of the pair of first signal contacts 200A project forwardly from the first protrusion 110A and are surrounded by the first shell 300A. The anchor hole 112 is located below the pair of contact holding holes 111 and passes through the first protrusion 110A along the fitting orientation D12. The anchor portion 350 of the first shell 300A is inserted into the anchor hole 112 from the front.

A slit 113 (first slit) may be formed in the first protrusion 110A. The slit 113 allows displacement of the intermediate connection portion 360 along the fitting orientation D12. For example, the slit 113 is formed along the fitting orientation D12 along the entire length of the lower portion of the anchor hole 112, and the intermediate connection portion 360 is placed in the slit 113. Because the slit 113 extends along the fitting orientation D12, displacements of the intermediate connection portion 360 along the fitting orientation D12 are allowed.

The housing 100 may further include a first support portion 114A. The first support portion 114A projects forward from the first protrusion 110A and is located between the contact portion 202 and the coupling wall 320. For example, the first support portion 114A protrudes forward from the first protrusion 110A between the pair of contact holding holes 111 and the anchor hole 112.

The second protrusion 110B protrudes from the receding surface 102 and is located between the pair of the projecting portion 340 of the second shell 300B and holds the pair of second signal contacts 200B and the second shell 300B. For example, the second protrusion 110B includes a pair of contact holding hole 111 (located above the second protrusion 110B) and the anchor hole 112, similarly to the first protrusion 110A. The contact portions 202 of the pair of second signal contacts 200B are inserted into the pair of contact holding holes 111 from the rear. End portions of the contact portions 202 of the pair of second signal contacts 200B protrude forwardly from the second protrusion 110B and are surrounded by the second shell 300B. The anchor portion 350 of the second shell 300B is inserted into the anchor hole 112 from the front. Similarly to the first protrusion 110A, the slit 113 may be formed in the second protrusion 110B. The intermediate connection portion 360 of the second shell 300B is placed in the slit 113.

The housing 100 may further include a second support portion 114B that is similar to the first support portion 114A. The second support portion 114B projects forward from the second protrusion 110B and is located between the contact portion 202 and the coupling wall 320. For example, the second support portion 114B projects forward from the second protrusion 110B between the pair of contact holding holes 111 and the anchor hole 112.

Referring back to FIGS. 5 and 6, the first connector 2 may further include a conductive outer shell 400. The housing 100 includes a back surface 103 of the facing surface 101 and the outer shell 400 covers the back surface 103.

For example, the outer shell 400 includes a main plate portion 410, a pair of outer side walls 420, and a pair of anchor portions 430, and is formed by punching and bending a metallic thin plate material. The main plate portion 410 extends to cover at least a portion of the back surface 103. The pair of outer side walls 420 are provided at both end portions of the main plate portion 410 in the arrangement orientation D11. For example, the pair of outer side walls 420 bend downward relative to the main plate portion 410 at both end portions of the main plate portion 410 and face each other along the arrangement orientation D11. The pair of the anchor portions 430 are also provided at both end portions of the main plate portion 410 in the arrangement orientation D11, respectively, and are located rearward of the pair of the outer side wall 420. For example, the pair of anchor portions 430 bend downward relative to the main plate portion 410 at both end portions of the main plate portion 410 and face each other along the arrangement orientation D11. When viewed from the front, the plurality of shells 300 are located between the pair of outer side walls 420 and also located between the pair of anchor portions 430.

The pair of anchor portions 430 are held on the housing 100. For example, the housing 100 further includes a pair of outer holding holes 121 respectively corresponding to the pair of anchor portions 430. Each of the pair of outer holding holes 121 passes vertically through the housing 100. The pair of anchor portions 430 are inserted into the pair of outer holding holes 121 from above.

The pair of outer side walls 420 may project forward from the front surface of the housing 100. Thus, the second connector 3 is smoothly guided along the fitting orientation D12.

Both end portions of the main plate portion 410 are formed with a pair of projecting portions 412 projecting forward from the front surface of the housing 100, and the pair of projecting portions 412 are formed with a pair of lock openings 411. Each of the pair of lock openings 411 is located between the plurality of the shell 300 and the pair of outer side walls 420 when viewed from below. A pair of lock claws 814 of the second connector 3, which will be described later, engages with the pair of lock openings 411.

The outer shell 400 may further include a pair of outer connection portions 421. The pair of outer connection portions 421 are formed in each of the pair of outer side walls 420 to be electrically connected to the circuit board 10 in a state where the facing surface 101 faces the circuit board 10. For example, each of the pair of outer connection portions 421 is formed at the lower edge of the corresponding outer side wall 420 and is connected to a ground terminal formed on the circuit board 10 by soldering or the like.

Second Connector

As described above, the second connector 3 is connected to the plurality of cables 20. As particularly illustrated in FIG. 11, each of the plurality of cables 20 includes at least one signal conductor 24. One cable 20 transmits one type of signal. For example, the cable 20 transmits one type of difference signal. For example, the cable 20 includes a pair of electric wires 21, an outer conductor 22, and an insulating outer sheath 23. Each of the pair of electric wires 21 includes one signal conductor 24 and an insulating inner sheath 25 covering the signal conductor 24. Hereinafter, the pair of the signal conductors 24 of the electric wire 21 is referred to as a pair of signal conductors 24. The above-described difference signal is transmitted by the pair of signal conductors 24. The outer conductor 22 surrounds the pair of electric wires 21 and the outer sheath 23 covers the outer conductor 22.

Figure 11:
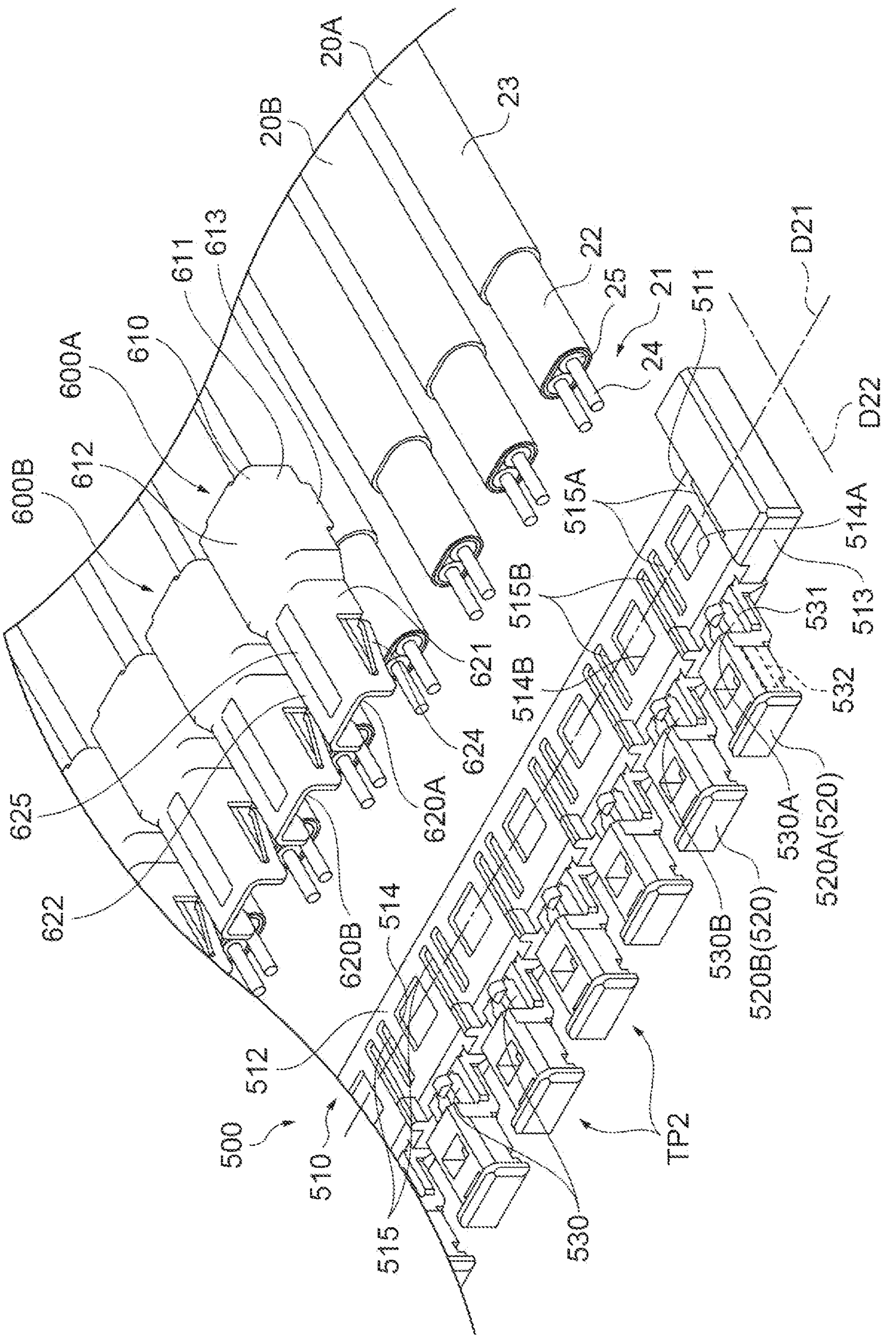
FIG. 11 is a partial enlarged view of FIG. 10.

FIG. 10 is an exploded perspective view of the second connector 3 and FIG. 11 is a partial enlarged view of FIG. 10. As illustrated in FIG. 10, the second connector 3 includes the base unit 500 and a plurality of shells 600. As illustrated in FIG. 11, the base unit 500 includes the connector base 510, the plurality of insulating housings 520, and the plurality of conductive signal contacts 530.

The connector base 510 includes a facing surface 511. The facing surface 511 faces an outer periphery of an end portion of the plurality of cables 20 arranged along an arrangement orientation D21. The plurality of housings 520 correspond to the plurality of cables 20, respectively. The plurality of housings 520 are aligned along the arrangement orientation D21 and each protrude along a fitting orientation D22 substantially parallel to the facing surface 511 and intersecting (for example, substantially perpendicular to) the arrangement orientation D21 in a direction away from the end portion of the corresponding the cable 20.

Hereinafter, for convenience of description, a direction in which the facing surface 511 faces is referred to as "upward", and an opposite direction thereof is referred to as "downward". Further, a direction in which the plurality of housings 520 protrude from the connector base 510 is referred to as "front", and an opposite direction thereof is referred to as "rear". According to this definition, the plurality of cables 20 extend rearward from the connector base 510. In a state where the second connector 3 is fitted to the first connector 2, the upper and lower sides in the description of the first connector 2 coincide with the upper and lower sides in the description of the second connector 3. Further, the front in the description of the second connector 3 corresponds to the rear in the description of the first connector 2, and the rear in the description of the second connector 3 corresponds to the front in the description of the first connector 2.

The plurality of signal contacts 530 include a plurality of pairs of the signal contacts 530 respectively corresponding to the plurality of housings 520. Each of the plurality of pairs of the signal contacts 530 is held in a corresponding housing 520. The above-described pair of signal conductors 24 is connected to each of the plurality of pairs of signal contacts 530.

The plurality of shells 600 correspond to the plurality of housings 520, respectively. Each of the plurality of shells 600 surrounds a corresponding housing 520.

The second connector 3 includes a plurality of sets of signal transmission portions TP2 each corresponding to the plurality of housings 520. The plurality of sets of the signal transmission portions TP2 are arranged along the arrangement orientation D21 and transmit the plurality of types of signals described above, respectively. Hereinafter, an example configuration of two sets of the signal transmission portions TP2, which are the first and second from the right side in the drawing, will be described in more detail as a representative of a plurality of sets of the signal transmission portions TP2. The first signal transmission portion TP2 from the right side in the drawing corresponds to the first signal transmission portion TP1 from the left side in FIG. 7. The second signal transmission portion TP2 from the right side in the drawing corresponds to the second signal transmission portion TP2 from the left side in FIG. 7.

Although the configurations of the plurality of signal transmission portions TP2 are common, for convenience of explanation, the housing 520, the signal contact 530, and the shell 600 belonging to the first signal transmission portion TP2 from the right side in FIG. 11 are identified as a first housing 520A, a first signal contact 530A, and a first shell 600A, and the housing 520, the signal contact 530, and the shell 600 belonging to the second signal transmission portion TP2 from the right side are identified as a second housing 520B, a second signal contact 530B, and a second shell 600B. The cable 20 corresponding to the first signal transmission portion TP2 from the right first from the right side is identified as a first cable 20A, and the cable 20 belonging to the second signal transmission portion TP2 from the right side is identified as a second cable 20B.

The first housing 520A and the second housing 520B are aligned along the arrangement orientation D21 and protrude forward from the connector base 510 along the fitting orientation D22.

As illustrated in FIG. 11, the pair of first signal contacts 530A are held in the first housing 520A and connected to the pair of signal conductors 24 of the first cable 20A, respectively. Each of the pair of the first signal contacts 530A portions includes a connection portion 531 (first connection portion) and a contact portion 532 (first contact portion) that are arranged in order toward the front.

The first housing 520A holds the pair of first signal contacts 530A with the connection portion 531 exposed above and the contact portion 532 exposed below (see FIG. 3). As a result, the signal conductor 24 can be connected to the connection portion 531 from above, and the contact portion 532 can contact the first signal contact 200A of the mate connector (the first connector 2) from above (see FIG. 4).

In a leading end portion of the first cable 20A, at a portion corresponding to the connection portion 531, the outer sheath 23, the outer conductor 22, and the inner sheath 25 are removed and the exposed pair of the signal conductors 24 are connected to the connection portion 531, respectively.

The first signal contact 530A is formed by, for example, punching and bending a metallic thin plate material.

The pair of second signal contacts 530B is held on the second housing 520B and connected to the pair of signal conductors 24 of the second cable 20B respectively. Each of the pair of second signal contacts 530B includes a connection portion 531 (second connection portion) and a (contact portion 532 (second contact portion), similarly to the first housing 520A.

The second housing 520B holds the pair of second signal contacts 530B with the connection portion 531 exposed above and the contact portion 532 exposed below (see FIG. 3). As a result, the signal conductor 24 can be connected to the connection portion 531 from above, and the contact portion 532 can contact the second signal contact 200B of the mate connector (the first connector 2) from above (see FIG. 4).

In a leading end portion of the second cable 20B, at a portion corresponding to the connection portion 531, the outer sheath 23, the outer conductor 22, and the inner sheath 25 are removed and the exposed pair of the signal conductors 24 are connected to the connection portion 531, respectively.

The first shell 600A is secured to the connector base 510 to surround the first housing 520A about an axis along the fitting orientation D22. For example, the first shell 600A includes a base portion 610 (first base portion) and an end portion 620 (first end portion).

The base portion 610 surrounds the first cable 20A and is secured to the connector base 510. In the leading end portion of the first cable 20A, at a portion corresponding to the base portion 610, the outer sheath 23 is removed. The base portion 610 surrounds the outer conductor 22 exposed by removal of the outer sheath 23. The shape surrounding the outer conductor 22 is not particularly limited. The base portion 610 may surround the outer conductor 22 in a circular shape or surround the outer conductor 22 in a polygonal shape. As an example, the base portion 610 may enclose the outer conductor 22 in a rectangular shape. For example, the base portion 610 includes a pair of base side walls 611 (first base side wall) and a base coupling wall 612 (first base coupling wall). The pair of base side walls 611 face each other along the arrangement orientation D21. The outer conductor 22 of the first cable 20A is located between the pair of base side walls 611 of the first shell 600A. The base coupling wall 612 extends substantially parallel to the facing surface 511 and connects the pair of base side walls 611.

The end portion 620 extends forward from the base portion 610 along the fitting orientation D22 and surrounds the first housing 520A. The shape surrounding the first housing 520A is not particularly limited. The end portion 620 may surround the first housing 520A in a circular shape or surround the first housing 520A in a polygonal shape. As an example, the end portion 620 may enclose the first housing 520A in a rectangular shape. For example, the end portion 620 includes a pair of end side walls 621 (first end side wall) and an end coupling wall 622 (first end coupling wall). The pair of end side walls 621 are connected to the pair of base side walls 611. The end coupling wall 622 is connected to the base coupling wall 612 and connects the pair of end side walls 621.

Figure 12:
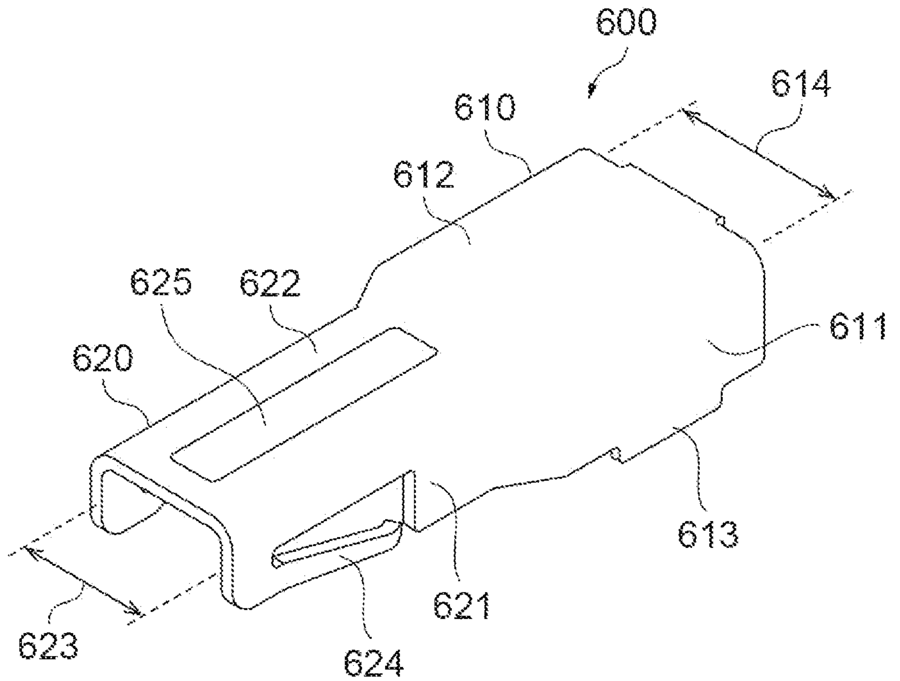
FIG. 12 is an enlarged view of a shell of the second connector viewed from above.

Compared to a gap 614 of the pair of base side walls 611, a gap 623 of the pair of end coupling walls 622 is smaller (see FIG. 12). The outer conductor 22 of the first cable 20A is present in the base portion 610, while there is no the outer conductor 22 of the first cable 20A in the end portion 620. By making the gap 623 at the position where the outer conductor 22 does not exist smaller than the gap 614 at the position where the outer conductor 22 exists, the evenness of the arrangement relationship between the pair of the signal conductor 24 and the metallic body at the ground potential surrounding the pair of the signal conductor 24 may be improved, the signal transmission characteristics may further be improved.

Returning to FIG. 11, an end portion 620A fits into the upper portion of the first shell 300A. For example, a pair of the end side walls 621 overlap the inner surfaces of the pair of side walls 310 of the first shell 300A, respectively, and the end coupling wall 622 overlaps the inner surface of the facing wall 330. When the end portion 620A fits into the first shell 300A in this manner, the surrounding of the first housing 520A by the end portion 620A is complemented by the first shell 300A. For example, the lower portion of the first housing 520A that is not surrounded by the end portion 620A is surrounded by the first shell 300A.

In addition, the surrounding of the pair of the first signal contacts 200A by the first shell 300A is complemented by the end portion 620A. For example, a gap of the surrounding by the shell slit 333 is complemented by the end coupling wall 622 of the end portion 620A (see FIG. 4).

Figure 13:
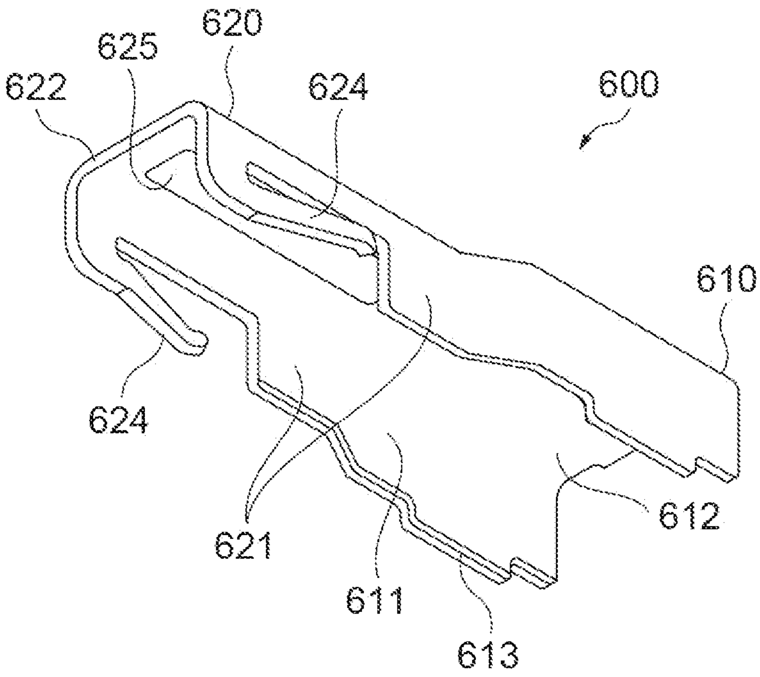
FIG. 13 is an enlarged view of the shell of the second connector viewed from below.

Each of the pair of the end side walls 621 may have an elastic contact portion 624 (first elastic contact portion) (see FIGS. 12 and 13). The elastic contact portion 624 approaches the first housing 520A by application of an external force and leaves the first housing 520A by removal of the external force. The elastic contact portions 624 of the pair of the end side walls 621 respectively contact the inner surfaces of the pair of the side walls 310 of the first shell 300A. In this way, the surrounding of the first housing 520A by the end portion 620A is more strongly complemented by the first shell 300A.

The end coupling wall 622 may include a contact portion 625. The contact portion 625 extends along the fitting orientation D12 at a location intermediate the pair of the end side wall 621 and bulges upwardly. The end coupling wall 622 is wider than the shell slit 333 of the first shell 300A. Thus, the end coupling wall 622 straddles the shell slit 333 and contacts both the portion 331 and the portion 332 of the facing wall 330. As a result, the surrounding of the pair of the first signal contact 200A by the first shell 300A is more firmly complemented by the end portion 620A.

The second shell 600B is secured to the connector base 510 to surround the second housing 520B about an axis along the fitting orientation D22. For example, the second shell 600B includes the base portion 610 (second base portion) and the end portion 620 (second end portion), similarly to the first shell 600A.

The base portion 610 surrounds the second cable 20B and is secured to the connector base 510. The base portion 610 of the second shell 600B includes the pair of base side walls 611 (second base side wall) and the base coupling wall 612 (second base coupling wall), similarly to the base portion 600A of the first shell 600A. In the leading end portion of the second cable 20B, at a portion corresponding to the base portion 610, the outer sheath 23 is removed. The base portion 610 surrounds the outer conductor 22 exposed by removal of the outer sheath 23.

The end portion 620 extends forward from the base portion 610 along the fitting orientation D22 and surrounds the second housing 520B. The end portion 620 of the second shell 600B includes the pair of end side walls 621 (second end side wall) and the end coupling wall 622 (second end coupling wall), similarly to the base portion 610 of the first shell 600A.

An end portion 620B fits over the upper portion of the second shell 300B. For example, the pair of end side walls 621 overlap the inner surfaces of the pair of side walls 310 of the second shell 300B, respectively, and the end coupling wall 622 overlaps the inner surface of the facing wall 330. Thus, when the end portion 620B fits into the second shell 300B, the surrounding of the second housing 520B by the end portion 620B is complemented by the second shell 300B. For example, the lower portion of the second housing 520B that is not surrounded by the end portion 620B is surrounded by the second shell 300B.

In addition, the surrounding of the pair of the second signal contact 200B by the second shell 300B is complemented by the end portion 620B. For example, a gap in the surrounding by the shell slit 333 is complemented by the end coupling wall 622 of the end portion 620B.

Similarly to the pair of end side walls 621 of the first shell 600A, each of the pair of end side walls 621 of the second shell 600B may include the elastic contact portion 624 (second elastic contact portion). Similarly to the end coupling wall 622 of the first shell 600A, the end coupling wall 622 of the second shell 600B may include the contact portion 625.

The connector base 510 may include a conductive base plate 512 and an insulating base housing 513. The base plate 512 extends along the facing surface and supports the plurality of cables 20 from below. The base housing 513 holds the base plate 512, the first housing 520A, and the second housing 520B. The base unit 500 is formed by insert molding performed in a state where the base plate 512 and the plurality of the signal contact 530 are arranged, by molding the base housing 513 and the plurality of the housing 520 with a resinous material, or the like.

The base portion of the first shell 600A surrounds the outer conductor 22 of the first cable 20A with the pair of base side walls 611, the base connecting wall 612 and the base plate 512 and is secured to the base plate 512. The base portion 610 of the second shell 600B surrounds the outer conductor 22 of the second cable 20B with the pair of base side walls 611, the base connecting wall 612 and the base plate 512 and is secured to the base plate 512. The base plate 512 electrically connects the base portion 610 of the first shell 600A and the base portion 610 of the second shell 600B.

In the base portion 610 of the first shell 600A, the outer conductor 22 of the first cable 20A is electrically connected to the base plate 512. For example, the outer conductor 22 is fixed to the base plate 512 by soldering or the like. In the base portion 610 of the second shell 600B, the outer conductor 22 of the second cable 20B is electrically connected to the base plate 512. For example, the outer conductor 22 is fixed to the base plate 512 by soldering or the like.

The base plate 512 may include a plurality of fixing holes 514 each corresponding to the plurality of cables 20. The plurality of fixing holes 514 are arranged along the arrangement orientation D11 and pass through the base plate 512 along a vertical direction intersecting (for example, substantially perpendicular to) the facing surface 511. Each of the plurality of fixing holes 514 exposes a corresponding the outer conductor 22 of the cable 20 downward.

The plurality of fixing holes 514 include a first fixing hole 514A corresponding to the first cable 20A and a second fixing hole 514B corresponding to the second cable 20B. The first fixing hole 514A exposes the outer conductor 22 of the first cable 20A downward, and the second fixing hole 514B exposes the outer conductor 22 of the second cable 20B downward.

As described above for the first shell 600A and the second shell 600B, since each of the plurality of shells 600 includes the pair of base side wall 611, the second connector 3 includes a plurality of pairs of the base side walls 611 that arranged along the arrangement orientation D21. In contrast, the base plate 512 may include a plurality of pairs of shell fixing holes 515 corresponding to the plurality of pairs of the base side walls 611, respectively.

The plurality of fixing holes 514 and the plurality of pairs of the shell fixing holes 515 are aligned along the arrangement orientation D21. In this arrangement, one the fixing hole 514 is disposed between each of the pairs of the shell fixing holes 515. Each of the plurality of pairs of the shell fixing holes 515 passes through the base plate 512 along the up-down direction and exposes the corresponding pair of the base side walls 611 downward. Accordingly, the plurality of pairs of the base side walls 611 and the outer conductors 22 of the plurality of cables 20 are exposed to the lower side in a state of being arranged in a row. Therefore, the plurality of pairs of the base side walls 611 and the outer conductors 22 of the plurality of cables 20 can be collectively fixed to the base plate 512 by soldering or the like from below.

The plurality of pairs of the shell fixing holes 515 include a pair of first shell fixing holes 515A corresponding to the pair of base side walls 611 of the first shell 600A, respectively, and a pair of second shell fixing holes 515B corresponding to the pair of base side walls 611 of the second shell 600B, respectively. The first fixing hole 514A is located between the pair of first shell fixing holes 515A, and the second fixing hole 514B is located between the pair of second shell fixing holes 515B.

Each of the plurality of pairs of the base side walls 611 may include a fixing piece 613 inserted into the corresponding shell fixing hole 515. For example, each of the pair of base side walls 611 of the first shell 600A may include the fixing piece 613 (first fixed piece) inserted into the corresponding first shell fixing hole 515A. Each of the pair of base side walls 611 of the second shell 600B may include the fixing piece 613 (second fixed piece) inserted into the corresponding second shell fixing hole 515B. Thus, since the plurality of shells 600 can be positioned and temporarily fixed to the base plate 512 before fixing by soldering or the like, the workability when fixing the plurality of pairs of the base side walls 611 and the outer conductor 22 of the plurality of cables 20 to the base plate 512 is improved. The fixing piece 613 is fixed to the base plate 512 by soldering or the like while being inserted into the corresponding the shell fixing hole 515.

Returning to FIG. 10, the second connector 3 may further include an insulating outer housing 700. The outer housing 700 accommodates the connector base 510 with the plurality of shells 600 including the first shell 600A and the second shell 600B fixed. The outer housing 700 may include a front wall 710 intersecting (for example, substantially perpendicular to) the fitting orientation D22. The front wall 710 may include a plurality of openings 711 each corresponding to the plurality of housings 520. Each of the plurality of housings 520 protrudes forward from the outer housing 700 via the corresponding opening 711 while being surrounded by the shell 600.

The plurality of openings 711 include a first opening 711A corresponding to the first housing 520A and a second opening 711B corresponding to the second housing 520B. The first housing 520A protrudes forward from the outer housing 700 from through the first opening 711A, surrounded by the first shell 600A. The second housing 520B protrudes forward from the outer housing 700 from through the second opening 711B, surrounded by the second shell 600B.

The second connector 3 may further include an insulating a separator 730 secured to the outer housing 700 and regulating gaps of the plurality of cables 20 including gaps between the first cable 20A and the second cable 20B. The separator 730 holds the plurality of cables 20 from outside the outer sheath 23 behind the connector base 510. The connector base 510 is disposed between the front wall 710 and the separator 730. The separator 730 includes a plurality of openings 731 respectively corresponding to the plurality of cables 20 (see FIGS. 2 and 3). The plurality of openings 731 are arranged along the arrangement orientation D21. Each of the plurality of openings 731 passes through the separator 730 along the fitting orientation D22. Each of the plurality of cables 20 is held in the corresponding opening 731. By means of the separator 730, distances between the cables 20 can be kept suitable and the signal transmission characteristics can be further improved. The separator 730 can also increase the strength of fixation of the plurality of cables 20 to the second connector 3.

The separator 730 is formed by two color molding of resins performed in a state where the base unit 500, the plurality of shells 600 and the outer housing 700 are attached to end portions of the plurality of cables 20. The separator 730 may be formed by resin-sealing by potting. The base unit 500, the plurality of shells 600 and the outer housing

700 may be attached to the end portion of the cable 20 with the pre-formed the separator 730 attached to the plurality of cables 20. The separator 730 may be divided into an upper member and a lower member around the plurality of the opening 731 portions, and the upper member and the lower member may be combined so as to sandwich the plurality of the cable 20 portions. The separator 730 may be attached to the base unit 500 or may be integrally molded with the base unit 500. Accordingly, the fixing strength of the plurality of cables 20 to the second connector 3 may increase.

The second connector 3 may further include a lock member 800. The lock member 800 prevents removal of the second connector 3 fitted to the first connector 2. The lock member 800 includes a pair of a lock portions 810 and a lock knob 820. The pair of lock portions 810 are held by the outer housing 700 so as to respectively correspond to the plurality of lock openings 411 of the first connector 2 (see FIG. 5). The outer housing 700 further includes, at both end portions in the arrangement orientation D11, a pair of lock accommodating portions 720 opening upwardly and rearwardly and a pair of hold bars 721 respectively corresponding to the pair of lock accommodating portions 720, and the pair of lock portions 810 are received in the pair of lock accommodating portions 720 respectively. Each of the pair of hold bars 721 is located above the rear end portion of the corresponding lock accommodating portion 720 and holds the lock portion 810 in the lock accommodating portion 720.

Each of the pair of lock portions 810 includes a lock base 811, a lock plate 812, and an elastic coupling portion 813. The lock base 811 extends along the fitting orientation D22 and contacts the bottom surface of the lock accommodating portion 720. The lock plate 812 extends along the fitting orientation D22 at a position away from the bottom surface of the lock accommodating portion 720 and faces the lock base 811 in the up-down direction. The upper surface of the lock plate 812 is formed with the lock claw 814 that engages the lock opening 411 of the first connector 2. The elastic coupling portion 813 connects the front end portion of the lock base 811 and the front end portion of the lock plate 812 so as to allow the lock claw 814 to be elastically displaced along the up-down direction.

With the lock portion 810, a locked state where the lock claw 814 engages the lock opening 411 and a released state where the lock claw 814 does not engage the lock opening 411 are switched. For example, when an external force is applied to the lock plate 812 from above and the lock plate 812 is brought close to the lock base 811, the lock claw 814 is lowered below the main plate portion 410 to be in the released state. In this state, the second connector 3 is fitted to the first connector 2, the lock claw 814 is arranged in the lower part of the lock opening 411, an external force to the lock plate 812 is removed, and the lock plate 812 is elastically returned in a direction away from the lock base 811, so that the lock claw 814 is arranged in the lock opening 411. Accordingly, the lock claw 814 is engaged with the inner periphery of the lock opening 411, and the released state is switched to the locked state. By again applying an external force to the lock plate 812 from above, bringing the lock plate 812 close to the lock base 811, and lowering the lock claw 814, the locked state is again switched to the unlocked state.

The lock knob 820 is an operation part for simultaneously applying external forces for switching the locked state to the unlocked state to the lock plates 812 of the pair of the lock portion 810. The lock knob 820 extends along the arrangement orientation D21 to connect the lock plates 812 of the pair of lock portions 810 and overhangs rearward to span over the plurality of cables 20. By pushing down the lock knob 820 toward the plurality of cables 20, an external force from above is simultaneously applied to the lock plates 812 of the pair of lock portions 810, and the locked state can be switched to the released state. The lock member 800 is formed by, for example, punching and bending a metallic thin plate.

Since the pair of lock accommodating portions 720 are provided at both end portions of the outer housing 700 in the arrangement orientation D21, the plurality of housings 520 are disposed between the pair of lock portions 810 when viewed from the front. By arranging the pair of lock portions 810 at positions that do not overlap the plurality of housings 520, both the reliability of the connection of the second connector 3 to the first connector 2 and the reduction in height of the connector system 1 are achieved.

Second Connector Assembly Procedure

Next, as an example of a connector assembling method, an example assembling procedure of the second connector 3 will be described. This procedure includes: letting the outer periphery of the first cable 20A to face the facing surface 511 and connecting the signal conductor 24 of the first cable 20A to the first signal contact 530A; letting the outer periphery of the second cable 20B to face the facing surface 511 and connecting the signal conductor 24 of the second cable 20B to the second signal contact 530B; placing the first shell 600A to surround the first housing 520A about an axis along the fitting orientation D22 in a state where the signal conductor 24 of the first cable 20A is connected to the first signal contact 530A; fixing the first shell 600A to the connector base 510; placing the second shell 600B to surround the second housing 520B about an axis along the fitting orientation D22 in a state where the signal conductor 24 of the second cable 20B is connected to the second signal contact 530B; and fixing the second shell 600B to the connector base 510.

Connecting the signal conductor 24 of the first cable 20A to the first signal contact 530A and connecting the signal conductor 24 of the second cable 20B to the second signal contact 530B may be performed simultaneously. Fixing the first shell 600A to the connector base 510 and fixing the second shell 600B to the connector base 510 may be performed simultaneously.

The assembly procedure of the second connector 3 may further include housing the connector base 510 with the first shell 600A and the second shell 600B secured therein in the insulating outer housing 700.

Fixing the first shell 600A to the connector base 510 may include: soldering the first shell 600A to the base plate 512 via the first shell fixing hole 515A; and soldering the outer conductor 22 of the first cable 20A to the base plate 512 via the first fixing hole 514A. Fixing the second shell 600B to the connector base 510 may include: soldering the second shell 600B to the base plate 512 via the second shell fixing hole 515B; and soldering the outer conductor 22 of the second cable 20B to the base plate 512 via the second shell fixing hole 515B.

Soldering the first shell 600A to the base plate 512, soldering the outer conductor 22 of the first cable 20A to the base plate 512, soldering the second shell 600B to the base plate 512, and soldering the outer conductor 22 of the second cable 20B to the base plate 512 may be performed at the same time.

Figure 14:
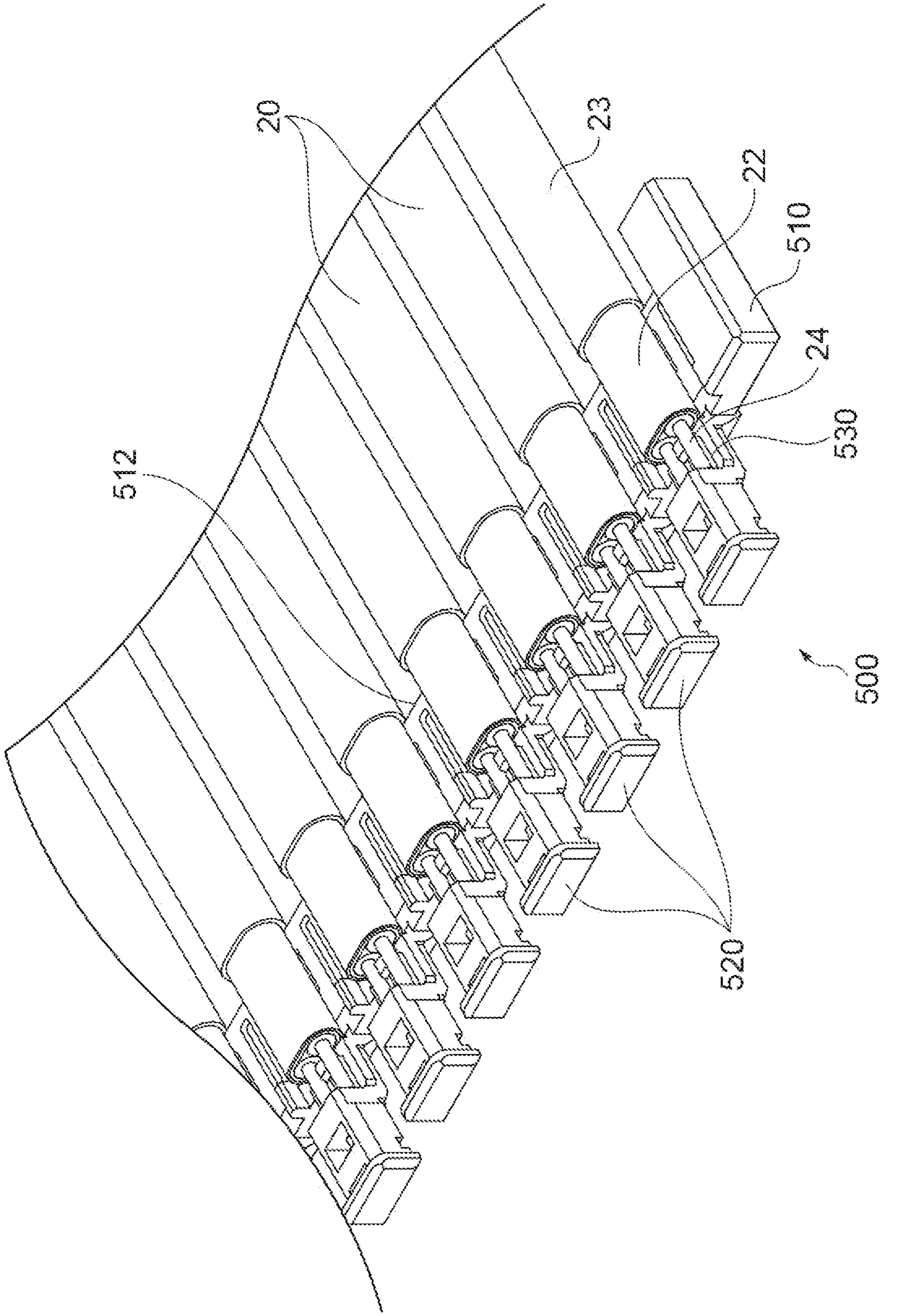
FIG. 14 is a diagram illustrating an example assembly procedure of a second connector.

Hereinafter, an example assembly procedure will be described with reference to FIGS. 14 to 17. As illustrated in FIG. 14, first, the plurality of cables 20 processed so that a portion in which the signal conductors 24 of the pair of electric wires 21 are exposed and a portion in which the outer conductor 22 is exposed are arranged in order from the tip are arranged on the base unit 500 so as to be arranged along the arrangement orientation D21. At this time, each of the signal conductors 24 of the plurality of cables 20 is brought into contact with the corresponding first signal contact 530A, and each of the outer conductors 22 of the plurality of cables 20 is exposed downward from the corresponding fixing hole 514. In this state, each signal conductor 24 is connected to the first signal contact 530A by a solid-phase bonding method such as soldering or ultrasonic bonding.

Figure 15:
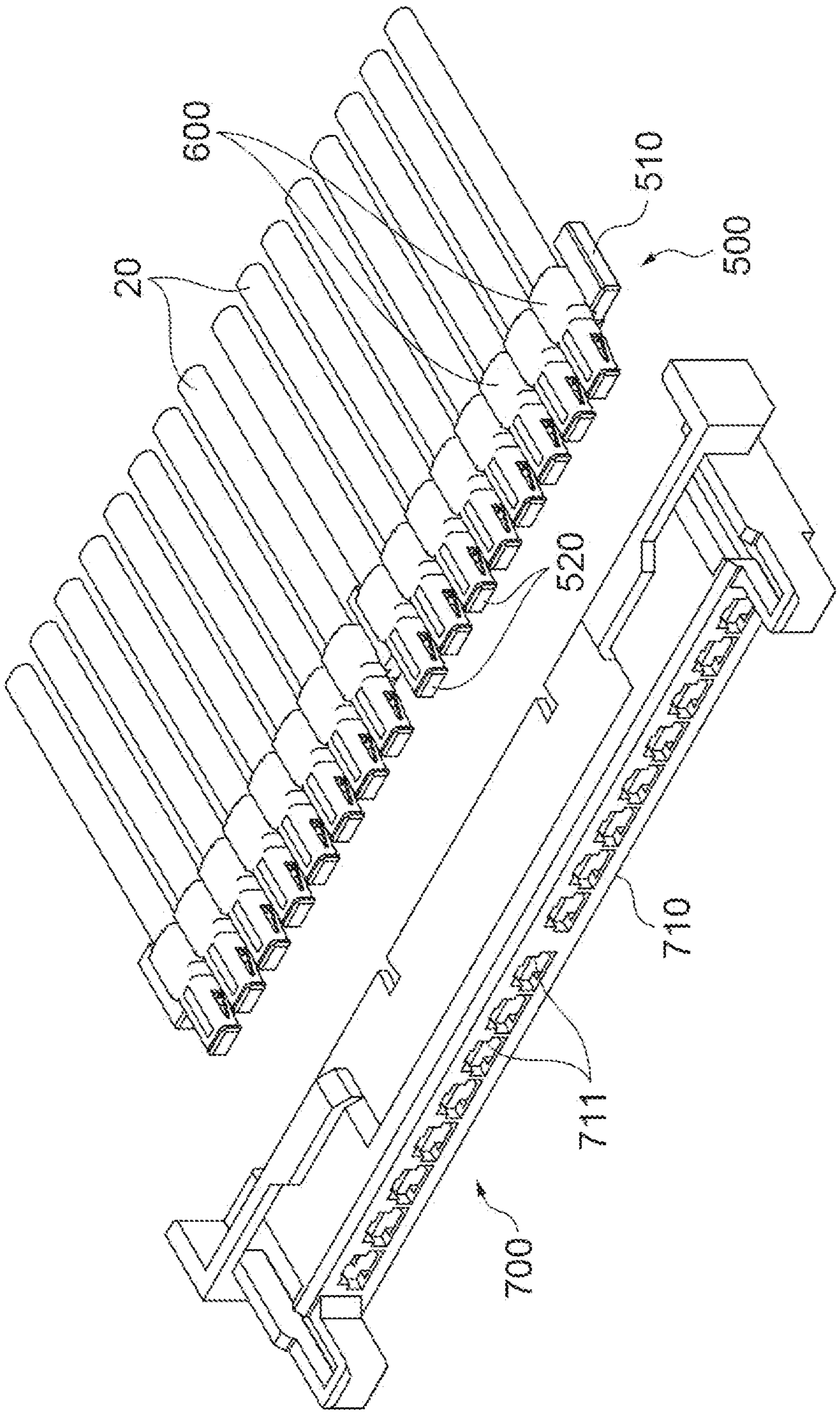
FIG. 15 is a diagram illustrating an example assembly procedure of a second connector.

Next, as illustrated in FIG. 15, each of the plurality of shells 600 is arranged so as to surround the corresponding first housing 520A. In this state, soldering through a plurality of the shell fixing hole 515 and a plurality of the fixing hole 514 is performed from below the base plate 512, and outer conductors 22 of the plurality of cables 20 and a plurality of shells 600 are fixed to the base plate 512.

Figure 16:
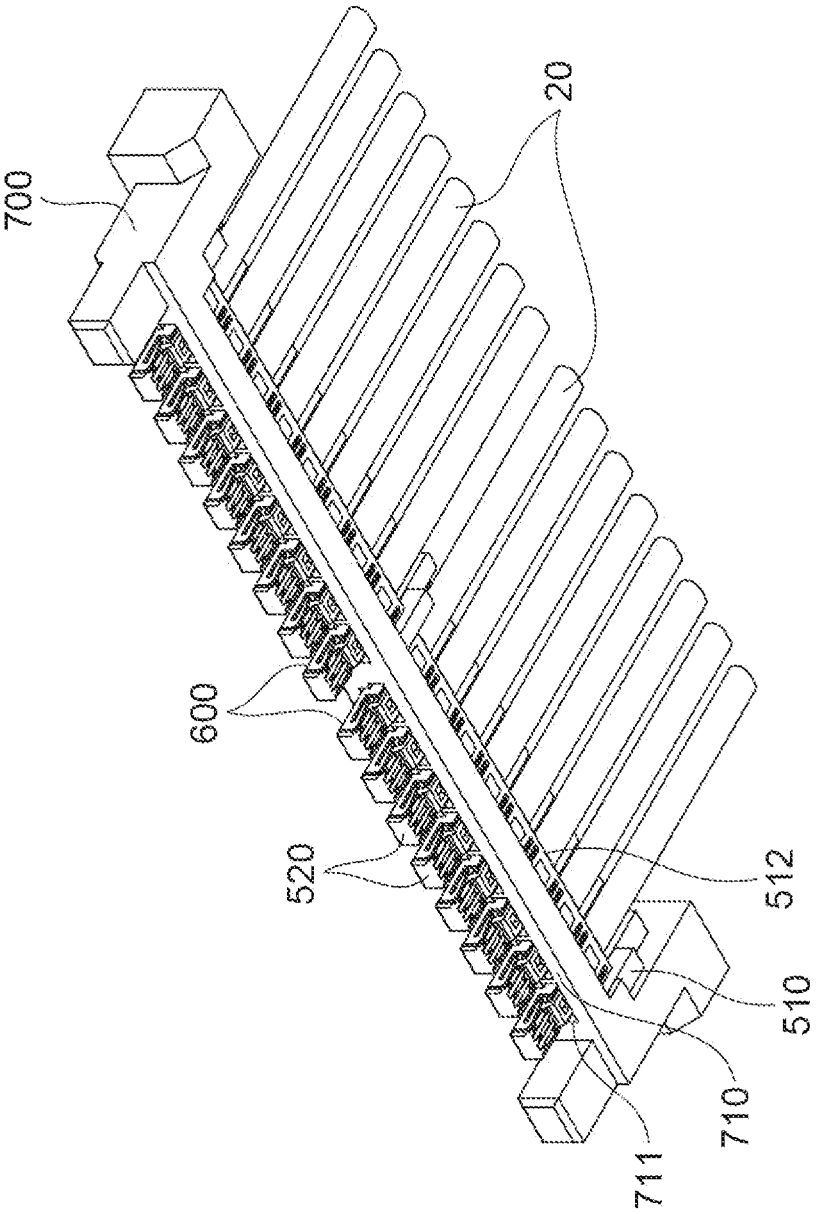
FIG. 16 is a diagram illustrating an example assembly procedure of a second connector.
Figure 17:
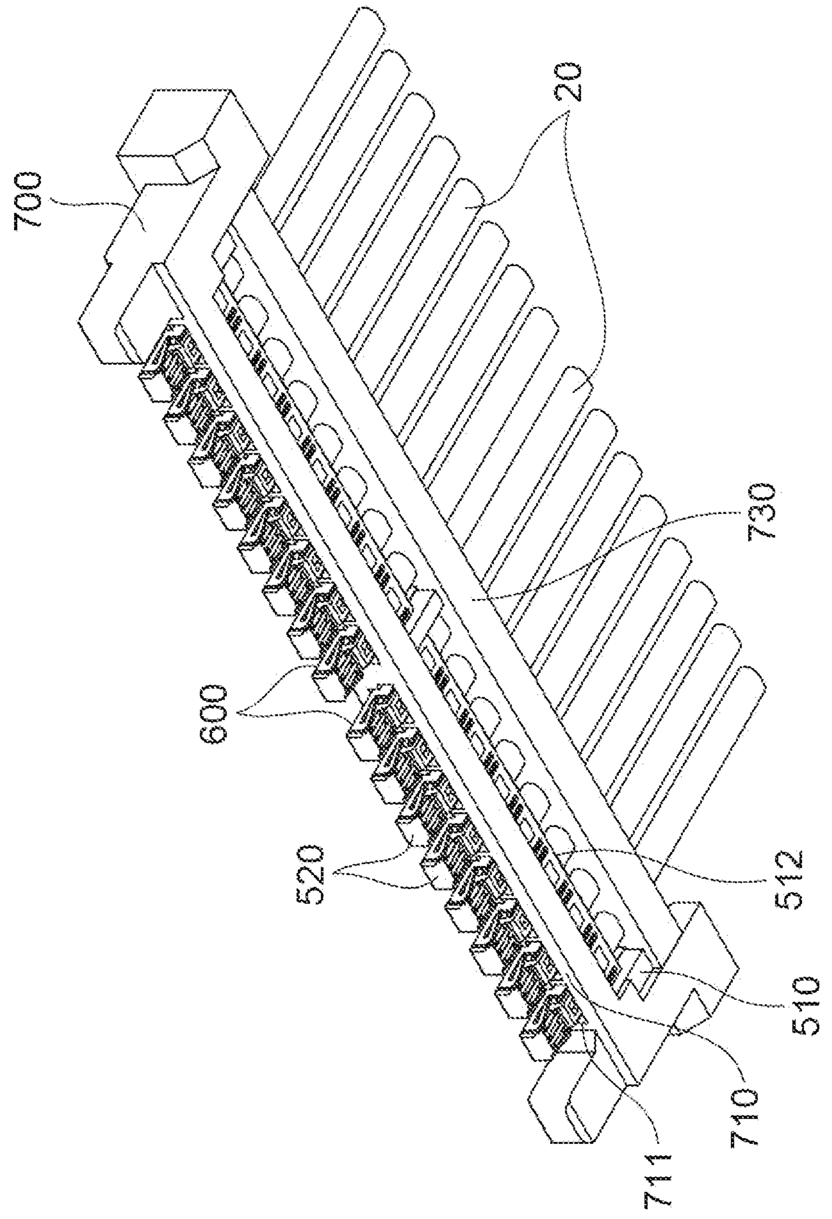
FIG. 17 is a diagram illustrating an example assembly procedure of a second connector.

Next, the base unit 500 to which the plurality of shells 600 are fixed is inserted into the outer housing 700 from the rear, and the plurality of housings 520 are protruded forward from the plurality of openings 711, respectively. Next, as illustrated in FIGS. 16 and 17, the separator 730 is formed by two color molding of resins. Finally, the lock member 800 is placed on the outer housing 700. Thus, the assembly of the second connector 3 is completed.

As described above, the connector (second connector 3) is a connector connected to a first cable 20A having a first signal conductor 24 and a second cable 20B having a second signal conductor 24, and includes: a connector base 510 having a facing surface 511 facing an outer periphery of the first cable 20A and an outer periphery of the second cable 20B; an insulating first housing 520A and an insulating second housing 520B held by the connector base 510 to be aligned along an arrangement orientation D21 parallel to the facing surface 511, and protrude from the connector base 510 toward same direction along a fitting orientation D22 perpendicular to the arrangement orientation D21; a base unit 500 including: a first signal contact 530A held by the first housing 520A and configured to be electrically connected to the first signal conductor 24; and a second signal contact 530B held by the second housing 520B and configured to be electrically connected to the second signal conductor 24; a conductive first shell 600A fixed to the connector base 510 to surround the first housing 520A about an axis along the fitting orientation D22, and a conductive second shell 600B fixed to the connector base 510 to surround the second housing 520B about an axis along the fitting orientation D22.

The transmission characteristics may be improved by individually shield the first signal contact 530A corresponding to the first cable 20A and the second signal contact 530B corresponding to the second cable 20B. However, the first shell 600A surrounding the first signal contact 530A may hinder the operation of connecting the first signal conductor 24 to the first signal contact 530A. The second shell 600B surrounding the second signal contact 530B may hinder the operation of connecting the second signal conductor 24 to the second signal contact 530B. In contrast, in this connector, since the connector base 510, the first housing 520A, the second housing 520B, the first signal contact 530A, and the second signal contact 530B are integrated as the base unit 500, the connector can be attached to the cable by a simple operation of attaching the first shell 600A and the second shell 600B to the base unit 500 after connecting the first cable 20A and the second cable 20B to the base unit 500. Therefore, both improvement in signal transmission characteristics and improvement in workability of attaching to the cable may be achieved.

The connector may further include an insulating outer housing 700 configured to accommodate the connector base 510 to which the first shell 600A and the second shell 600B have been fixed. The workability of attaching to the cable can be further improved by making the outer housing 700 retrofittable.

The outer housing 700 may have a front wall 710 perpendicular to the fitting orientation D22, and the front wall part 710 may have a first opening 711A and a second opening 711B aligned along the arrangement orientation D21. The first housing 520A may protrude from the outer housing 700 through the first opening 711A while being surrounded by the first shell 600A, and the second housing 520B may protrude from the outer housing 700 through the second opening 711B while being surrounded by the second shell 600B. The first shell 600A and the second shell 600B may be connected individually to the shell of the mating connector, while improving the strength of the housing.

The connector may further include an insulating separator 730 fixed to the outer housing 700 to regulate a distance between the first cable 20A and the second cable 20B. The connector base 510 may be arranged between the front wall part 710 and the separator 730. By maintaining the distance between the cables, the signal transmission characteristics can be further improved.

The first shell 600A may have: a first base part 610 configured to be fixed to the connector base 510 to surround the first cable 20A; and a first end part 620 extending from the first base part 610 along the fitting orientation D22 to surround the first housing 520A. The second shell 600B may have: a second base part 610 configured to be fixed to the connector base 510 to surround the second cable 20B; and a second end part 620 extending from the second base part 610 along the fitting orientation D22 to surround the second housing 520B. The signal transmission characteristics can be further improved.

The connector base 510 may include: a conductive base plate 512 along the opposing surface 511; and an insulating base housing 513 configured to hold the base plate 512, the first housing 520A, and the second housing 520B. The base plate 512 may electrically connect the first base part 610 and the second base part 610. By suppressing the potential difference between the first base part 610 and the second base part 610, the signal transmission characteristics can be further improved.

The first base part 610 may have: a pair of first base side walls 611 facing each other along the arrangement orientation D21; and a first base connecting wall 612 connecting the pair of first base side walls 611, and may surround the first cable 20A with the pair of first base side walls 611, the first base connecting wall 612, and the base plate 512. The second base part 610 may have: a pair of second base side walls 611 facing each other along the arrangement orientation D21; and a second base connecting wall 612 connecting the pair of second base side walls 611, and may surround the second cable 20B with the pair of second base side walls 611, the second base connecting wall 612, and the base plate 512. Both the shielding property of the first cable 20A by the first base part 610 and the shielding property of the second cable 20B by the second base part 610 are improved. Therefore, the signal transmission characteristics can be further improved.

The first end portion 620 may have: a pair of first end side walls 621 connected to the pair of first base side walls 611;

and a first end coupling wall 622 connected to the first base connecting wall 612 and coupling the pair of first end side walls 621. The second end portion 620 may have: a pair of second end side walls 621 connected to the pair of second base side walls 611; and a second end coupling wall 622 connected to the second base connecting wall 612 and coupling the pair of second end side walls 621. By leaving the shield facing the first end coupling wall 622 to the mate connector and also leaving the shield facing the second end coupling wall 622 to the mate connector, signal transmission characteristics may be improved and thinning of the connector may be achieved.

The first signal contact 530A may have: a first connection part 531 and a first contact part 532 aligned in order along the protruding direction of the first housing 520A with respect to the connector base 510, and the second signal contact 530B may have a second connection part 531 and a second contact part 532 arranged in order along the protruding direction of the first housing 520A. The first housing 520A may hold the first signal contact 530A to expose the first connection part 531 toward the first end coupling wall 622 and expose the first contact part 532 toward a direction opposite to a direction toward the first end coupling wall 622. The second housing 520B may hold the second signal contact 530B to expose the second connection part 531 toward the second end coupling wall 622 and expose the second contact part 532 toward a direction opposite to a direction toward the second end coupling wall 622. While exposing the first contact part 532 and the second contact part 532, which are shielded by the mate connector, to the outside of the first shell 600A and the second shell 600B, respectively, the first connection part 531 and the second connection part 531, which are not shielded by the mate connector, are surrounded by the first shell 600A and the second shell 600B, respectively. This allows for both improved signal transmission characteristics and thinning of the connector.

A distance between the pair of first end side walls 621 may be smaller than a distance between the pair of first base side walls 611, and a distance between the pair of second end side walls 621 may be smaller than a distance between the pair of second base side walls 611. The signal transmission characteristics can be further improved.

Each of the pair of first end side walls 621 may have a first elastic contact portion 532 configured to: approach the first housing 520A in response to an application of an external force; and move away from the first housing 520A in response to a removal of the external force. Each of the pair of second end side walls 621 may have a second elastic contact portion 532 configured to: approach the second housing 520B in response to an application of an external force; and move away from the second housing 520B in response to a removal of the external force. The electrical connection of the first shell 600A to the mate first shell 600A of the mate connector is strengthened, and the electrical connection of the second shell 600B to the mate second shell 600B of the mate connector is strengthened. Therefore, the signal transmission characteristics can be further improved.

The first cable 20A may further include a first outer conductor 22 surrounding the first signal conductor 24, and the second cable 20B may further include a second outer conductor 22 surrounding the second signal conductor 24. The base plate 512 may have: a first fixing hole 514A corresponding to the first outer conductor 22; and a second fixing hole 514B corresponding to the second outer conductor 22. The signal transmission characteristics and the mounting workability may further be improved.

The base plate 512 may have: a pair of first shell fixing holes 515A respectively corresponding to the pair of first base side walls 611; and a pair of second shell fixing holes 515B respectively corresponding to the pair of second base side walls 611. Each of the pair of first base side walls 611 may have a first fixing piece 613 to be inserted into a corresponding first shell fixing hole 515A, and each of the pair of second base side walls 611 may have a second fixing piece 613 to be inserted into a corresponding second shell fixing hole 515B. The first fixing hole 514A may be located between the pair of first shell fixing holes 515A, and the second fixing hole 514B may be located between the pair of second shell fixing holes 515B. The signal transmission characteristics and the mounting workability may further be improved.

An assembly method of another aspect of the disclosure includes: letting an outer periphery of a first cable 20A to a facing surface 511 of a base unit 500, the base unit 500 having: a connector base 510 having the facing surface 511; an insulating first housing 520A and an insulating second housing 520B held by the connector base 510 to be aligned along an arrangement orientation D21 parallel to the facing surface 511 and protrude from the connector base 510 toward a first direction perpendicular to the arrangement orientation D21 and parallel to the facing surface 511; a first signal contact 530A held by the first housing 520A; and a second signal contact 530B held by the second housing 520B; connecting a first signal conductor 24 of the first cable 20A to the first signal contact 530A; letting the outer periphery of a second cable 20B to face the facing surface 511; connecting a second signal conductor 24 of the second cable 20B to the second signal contact 530B; placing, in a state where the first signal conductor 24 is connected to the first signal contact 530A, a conductive first shell 600A to surround the first housing 520A about an axis parallel to the facing surface 511 and perpendicular to the arrangement orientation D21; fixing the first shell 600A to the connector base 510; placing, in a state where the second signal conductor 24 is connected to the second signal contact 530B, a conductive second shell 600B to surround the second housing 520B about an axis parallel to the facing surface 511 and perpendicular to the arrangement orientation D21; and fixing the second shell 600B to the connector base 510.

The assembly method may further include housing, in an insulating outer housing 700, the connector base 510 to which the first shell 600A and the second shell 600B are fixed.

The connector base 510 may have: a conductive base plate 512 along the opposing surface 511; an insulating base housing 513 holding the base plate 512, the first housing 520A, and the second housing 520B. The base plate 512 may have a first shell fixing hole 515A, a first fixing hole 514A, a second shell fixing hole 515B, and a second fixing hole 514B aligned along the arrangement orientation D21. Fixing the first shell 600A to the connector base 510 may include: soldering the first shell 600A to the base plate 512 through the first shell fixing hole 515A; and soldering a first outer conductor 22 of the first cable 20A to the base plate 512 through the first fixing hole 514A. Fixing the second shell 600B to the connector base 510 may include: soldering the second shell 600B to the base plate 512 through the second shell fixing hole 515B; and soldering a second outer conductor 22 of the second cable 20B to the base plate 512 through the second fixing hole 514B.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A connector connected to a first cable comprising a first signal conductor and a second cable comprising a second signal conductor, comprising:

a base unit comprising:

a connector base comprising a facing surface configured to face an outer periphery of the first cable and an outer periphery of the second cable;

an insulating first housing and an insulating second housing held by the connector base to be aligned along an arrangement orientation substantially parallel to the facing surface, and protrude from the connector base toward protruding direction along a fitting orientation intersecting the arrangement orientation;

a conductive first signal contact held by the first housing and configured to be electrically connected to the first signal conductor; and a conductive second signal contact held by the second housing and configured to be electrically connected to the second signal conductor;

a conductive first shell fixed to the connector base to surround the first housing about an axis along the fitting orientation;

a conductive second shell fixed to the connector base to surround the second housing about an axis along the fitting orientation, and an insulating outer housing configured to accommodate the connector base to which the first shell and the second shell have been fixed, wherein the outer housing comprises a front wall intersecting the fitting orientation, wherein the front wall comprises a first opening and a second opening aligned along the arrangement orientation, wherein the first housing protrudes from the outer housing through the first opening while being surrounded by the first shell, and wherein the second housing protrudes from the outer housing through the second opening while being surrounded by the second shell.

2. The connector according to claim 1, further comprising an insulating separator fixed to the outer housing to regulate a distance between the first cable and the second cable, wherein the connector base is arranged between the front wall and the separator.

3. The connector according to claim 1, wherein the first shell comprises:

a first base part configured to be fixed to the connector base to surround the first cable; and a first end portion extending from the first base part along the fitting orientation to surround the first housing, and wherein the second shell comprises:

a second base part configured to be fixed to the connector base to surround the second cable; and a second end portion extending from the second base part along the fitting orientation to surround the second housing.

4. The connector according to claim 3, wherein the connector base comprises:

a conductive base plate along the facing surface; and an insulating base housing configured to hold the base plate, the first housing, and the second housing, and wherein the base plate is configured to electrically connect the first base part and the second base part.

5. The connector according to claim 4, wherein the first base part comprises:

a pair of first base side walls facing each other along the arrangement orientation; and a first base connecting wall connecting the pair of first base side walls, wherein the pair of first base side walls, the first base connecting wall, and the base plate are configured to surround the first cable, wherein the second base part comprises:

a pair of second base side walls facing each other along the arrangement orientation; and a second base connecting wall connecting the pair of second base side walls, and wherein the pair of second base side walls, the second base connecting wall, and the base plate are configured to surround the second cable.

6. The connector according to claim 5, wherein the first end portion comprises:

a pair of first end side walls connected to the pair of first base side walls; and a first end coupling wall connected to the first base connecting wall and coupling the pair of first end side walls, and wherein the second end portion comprises:

a pair of second end side walls connected to the pair of second base side walls, and a second end coupling wall connected to the second base connecting wall and coupling the pair of second end side walls.

7. The connector according to claim 6, wherein the first signal contact comprises a first connection portion and a first contact portion aligned in order along the protruding direction, wherein the second signal contact comprises a second connection portion and a second contact portion aligned in order along the protruding direction, wherein the first housing holds the first signal contact to expose the first connection portion toward the first end coupling wall and expose the first contact portion toward a direction opposite to a direction toward the first end coupling wall, and wherein the second housing holds the second signal contact to expose the second connection portion toward the second end coupling wall and expose the second contact portion toward a direction opposite to a direction toward the second end coupling wall.

8. The connector according to claim 6, wherein a distance between the pair of first end side walls is smaller than a distance between the pair of first base side walls, and wherein a distance between the pair of second end side walls is smaller than a distance between the pair of second base side walls.

9. The connector according to claim 6, wherein each of the pair of first end side walls comprises a first elastic contact portion configured to:

approach the first housing in response to an application of an external force; and move away from the first housing in response to a removal of the external force, and wherein each of the pair of second end side walls comprises a second elastic contact portion configured to:

approach the second housing in response to an application of an external force; and move away from the second housing in response to a removal of the external force.

10. The connector according to claim 5, wherein the first cable further comprises a first outer conductor surrounding the first signal conductor, wherein the second cable further comprises a second outer conductor surrounding the second signal conductor, and the base plate comprises:

a first fixing hole corresponding to the first outer conductor; and a second fixing hole corresponding to the second outer conductor.

11. The connector according to claim 10, wherein the base plate comprises:

a pair of first shell fixing holes respectively corresponding to the pair of first base side walls; and a pair of second shell fixing holes respectively corresponding to the pair of second base side walls, wherein each of the pair of first base side walls comprises a first fixing piece configured to be inserted into a corresponding first shell fixing hole of the pair of first shell fixing holes, wherein each of the pair of second base side walls comprises a second fixing piece configured to be inserted into a corresponding second shell fixing hole of the pair of second shell fixing holes, wherein the first fixing hole is located between the pair of first shell fixing holes, and wherein the second fixing hole is located between the pair of second shell fixing holes.

12. The connector according to claim 1, wherein the first shell surrounds a pair of first signal contacts including the first signal contact, the pair of first signal contacts transmitting a first differential signal, and wherein the second shell surrounds a pair of second signal contacts including the second signal contact, the pair of second signal contacts transmitting a second differential signal.

13. The connector according to claim 12, wherein the pair of first signal contacts align along the arrangement orientation, and wherein the pair of second signal contacts align along the arrangement orientation.

14. An assembly method of a connector, the assembly method comprising:

pre-integrating a connector base, an insulating first housing, an insulating second housing, a first signal contact and a second signal contact to form a pre-integrated base unit, so that the first signal contact is held by the first housing, the second signal contact is held by the second housing, the first housing and the second housing are aligned along an arrangement orientation substantially parallel to a facing surface of the connector base, and each of the first housing and the second housing protruding from the connector base along a first direction intersecting the arrangement orientation and substantially parallel to the facing surface;

letting an outer periphery of a first cable face the facing surface of the pre-integrated base unit;

connecting a first signal conductor of the first cable to the first signal contact of the pre-integrated base unit;

letting an outer periphery of a second cable face the facing surface;

connecting a second signal conductor of the second cable to the second signal contact of the pre-integrated base unit;

placing, in a state where the first signal conductor is connected to the first signal contact, a conductive first shell to surround the first housing of the pre-integrated base unit about an axis substantially parallel to the facing surface and intersecting the arrangement orientation;

fixing the first shell to the connector base of the pre-integrated base unit;

placing, in a state where the second signal conductor is connected to the second signal contact, a conductive second shell to surround the second housing of the pre-integrated base unit about an axis substantially parallel to the facing surface and intersecting the arrangement orientation; and fixing the second shell to the connector base of the pre-integrated base unit.

15. The assembly method according to claim 14, further comprising housing, in an insulating outer housing, the connector base of the pre-integrated base unit to which the first shell and the second shell have been fixed.

16. The assembly method according to claim 14, wherein the connector base of the pre-integrated base unit comprises:

a conductive base plate along the facing surface;

an insulating base housing holding the base plate, the first housing, and the second housing, wherein the base plate comprises a first shell fixing hole, a first fixing hole, a second shell fixing hole, and a second fixing hole aligned along the arrangement orientation, wherein fixing the first shell to the connector base comprises:

soldering the first shell to the base plate through the first shell fixing hole; and soldering a first outer conductor of the first cable to the base plate through the first fixing hole, and wherein fixing the second shell to the connector base comprises:

soldering the second shell to the base plate through the second shell fixing hole; and soldering a second outer conductor of the second cable to the base plate through the second fixing hole.

17. The assembly method according to claim 16, wherein said soldering the first shell, said soldering the first outer conductor, said soldering the second shell, and said soldering the second outer conductor are performed at the same time.

18. The assembly method according to claim 15, further comprising, after said housing the connector base in the outer housing, forming an insulating separator fixed to the outer housing to regulate a distance between the first cable and the second cable.

19. A connector connected to a first cable comprising a first signal conductor and a second cable comprising a second signal conductor, comprising:

a base unit comprising:

a connector base comprising a facing surface configured to face an outer periphery of the first cable and an outer periphery of the second cable;

an insulating first housing and an insulating second housing held by the connector base to be aligned along an arrangement orientation substantially parallel to the facing surface, and protrude from the connector base toward protruding direction along a fitting orientation intersecting the arrangement orientation;

a conductive first signal contact held by the first housing and configured to be electrically connected to the first signal conductor; and a conductive second signal contact held by the second housing and configured to be electrically connected to the second signal conductor;

a conductive first shell fixed to the connector base to surround the first housing about an axis along the fitting orientation; and a conductive second shell fixed to the connector base to surround the second housing about an axis along the fitting orientation, wherein the first shell comprises:

a first base part configured to be fixed to the connector base to surround the first cable; and a first end portion extending from the first base part along the fitting orientation to surround the first housing, and wherein the second shell comprises:

a second base part configured to be fixed to the connector base to surround the second cable; and a second end portion extending from the second base part along the fitting orientation to surround the second housing.

20. The connector according to claim 19, wherein the connector base comprises:

a conductive base plate along the facing surface; and an insulating base housing configured to hold the base plate, the first housing, and the second housing, and wherein the base plate is configured to electrically connect the first base part and the second base part.

* * * * *